(12) United States Patent
Ishida

(10) Patent No.: US 7,803,074 B2
(45) Date of Patent: Sep. 28, 2010

(54) BELT TYPE CONTINUOUS VARIABLE TRANSMISSION, POWER UNIT HAVING THE BELT TYPE CONTINUOUS VARIABLE TRANSMISSION, VEHICLE MOUNTING THEREON THE BELT TYPE CONTINUOUS VARIABLE TRANSMISSION, AND SHEAVE FOR CONTINUOUS VARIABLE TRANSMISSION

(75) Inventor: Yousuke Ishida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 796 days.

(21) Appl. No.: 10/584,394

(22) PCT Filed: Mar. 4, 2005

(86) PCT No.: PCT/JP2005/003727

§ 371 (c)(1),
(2), (4) Date: May 24, 2007

(87) PCT Pub. No.: WO2005/090828

PCT Pub. Date: Sep. 29, 2005

(65) Prior Publication Data

US 2008/0047772 A1 Feb. 28, 2008

(30) Foreign Application Priority Data

Mar. 18, 2004 (JP) .............................. 2004-077826

(51) Int. Cl.
*F16H 55/56* (2006.01)
*F16H 59/00* (2006.01)
(52) U.S. Cl. ................. 474/8; 474/13; 474/15
(58) Field of Classification Search .................. 474/13, 474/15, 8; 192/105 A, 105 B
See application file for complete search history.

(56) References Cited

U.S. PATENT DOCUMENTS 1,618,644 A * 2/1927 Dickson .................. 192/105 A
2,196,475 A * 4/1940 Reed ....................... 192/105 B (Continued)

FOREIGN PATENT DOCUMENTS

JP 63-303253 12/1988

(Continued)

OTHER PUBLICATIONS

European search report for corresponding European application No. 05719999 lists the references above.

*Primary Examiner*—John Q Nguyen
*Assistant Examiner*—Henry Liu
(74) *Attorney, Agent, or Firm*—Keating & Bennett, LLP

(57) ABSTRACT

A belt type continuous variable transmission comprises a primary sheave, a secondary sheave, and a belt. The primary sheave comprises a first sheave body, a second sheave body that forms between it and the first sheave body a belt groove, about which a belt is entrained, a plurality of push bodies that slide the second sheave body according to centrifugal forces to change a width of the belt groove, and a plurality of stoppers that restrict movements of the push bodies by contacting with outer surfaces of the push bodies when the second sheave body reaches a position of minimum transmission gear ratio, in which the belt groove is made smallest in width. The stoppers are shaped to accelerate partial wear of the outer surfaces of the push bodies.

22 Claims, 15 Drawing Sheets

U.S. PATENT DOCUMENTS

| | | | | |
|---|---|---|---|---|
| 2,253,634 | A * | 8/1941 | Mack | 474/13 |
| 2,521,884 | A * | 9/1950 | Thostenson | 474/15 |
| 2,678,566 | A * | 5/1954 | Oehrli | 474/15 |
| 2,709,372 | A * | 5/1955 | Melone | 474/13 |
| 2,715,842 | A * | 8/1955 | Homuth | 474/15 |
| 2,721,639 | A * | 10/1955 | Miller | 192/54.5 |
| 2,902,129 | A * | 9/1959 | Reed | 192/105 B |
| 2,986,043 | A * | 5/1961 | Jaulmes | 474/15 |
| 2,987,934 | A * | 6/1961 | Thomas | 474/12 |
| 3,006,449 | A * | 10/1961 | Binder | 192/105 B |
| 3,066,546 | A * | 12/1962 | Thostenson | 474/14 |
| 3,230,787 | A * | 1/1966 | Siegal | 474/14 |
| 3,266,330 | A * | 8/1966 | Galleher | 474/14 |
| 3,362,242 | A * | 1/1968 | Watkins | 474/15 |
| 3,394,607 | A * | 7/1968 | Hubert | 474/15 |
| 3,395,587 | A * | 8/1968 | Casini | 474/12 |
| 3,574,366 | A * | 4/1971 | Thostenson | 403/359.5 |
| 3,599,504 | A * | 8/1971 | Taylor | 474/12 |
| 3,625,079 | A * | 12/1971 | Hoff | 474/12 |
| 3,648,532 | A * | 3/1972 | Vallieres | 474/14 |
| 3,659,470 | A * | 5/1972 | Beaudoin | 474/13 |
| 3,664,206 | A * | 5/1972 | Clauss, Jr. | 474/15 |
| 3,680,403 | A * | 8/1972 | Schupan | 474/13 |
| 3,685,366 | A * | 8/1972 | Schupan | 474/13 |
| 3,757,593 | A * | 9/1973 | Svenson | 474/12 |
| 3,975,964 | A * | 8/1976 | Adams | 474/15 |
| 4,028,953 | A * | 6/1977 | Lavallee | 474/13 |
| 4,102,214 | A * | 7/1978 | Hoff | 474/13 |
| 4,384,862 | A * | 5/1983 | Nakane | 474/13 |
| 4,487,595 | A * | 12/1984 | Quick et al. | 474/15 |
| 4,496,335 | A * | 1/1985 | Quick et al. | 474/15 |
| 4,499,965 | A * | 2/1985 | Oetting et al. | 180/165 |
| 4,515,575 | A * | 5/1985 | Kinbara et al. | 474/13 |
| 5,052,981 | A * | 10/1991 | Robert | 474/14 |
| 5,061,226 | A * | 10/1991 | Mott | 474/244 |
| 5,188,568 | A * | 2/1993 | Gourdon | 474/13 |
| 5,242,330 | A * | 9/1993 | Tateno | 474/13 |
| 5,361,744 | A * | 11/1994 | Teraoka | 123/561 |
| 5,458,539 | A * | 10/1995 | Landry | 474/13 |
| 5,514,040 | A * | 5/1996 | Robert | 474/13 |
| 6,109,127 | A * | 8/2000 | Liau | 74/336 B |
| 6,270,436 | B1 * | 8/2001 | Reik et al. | 474/8 |
| 6,336,879 | B1 * | 1/2002 | Schmid et al. | 474/28 |
| 6,520,878 | B1 * | 2/2003 | Leclair et al. | 474/14 |
| 6,682,450 | B2 * | 1/2004 | Mukai et al. | 474/15 |
| 7,063,633 | B2 * | 6/2006 | Robert | 474/13 |
| 2004/0082415 | A1 * | 4/2004 | Borghi | 474/13 |

FOREIGN PATENT DOCUMENTS

| | | |
|---|---|---|
| JP | 05-203004 | 8/1993 |
| JP | 08-061448 | 3/1996 |
| JP | 2000-055154 | 2/2000 |
| JP | 2001-248698 | 9/2001 |
| JP | 2002147553 A | 5/2002 |

* cited by examiner

[Fig. 1]
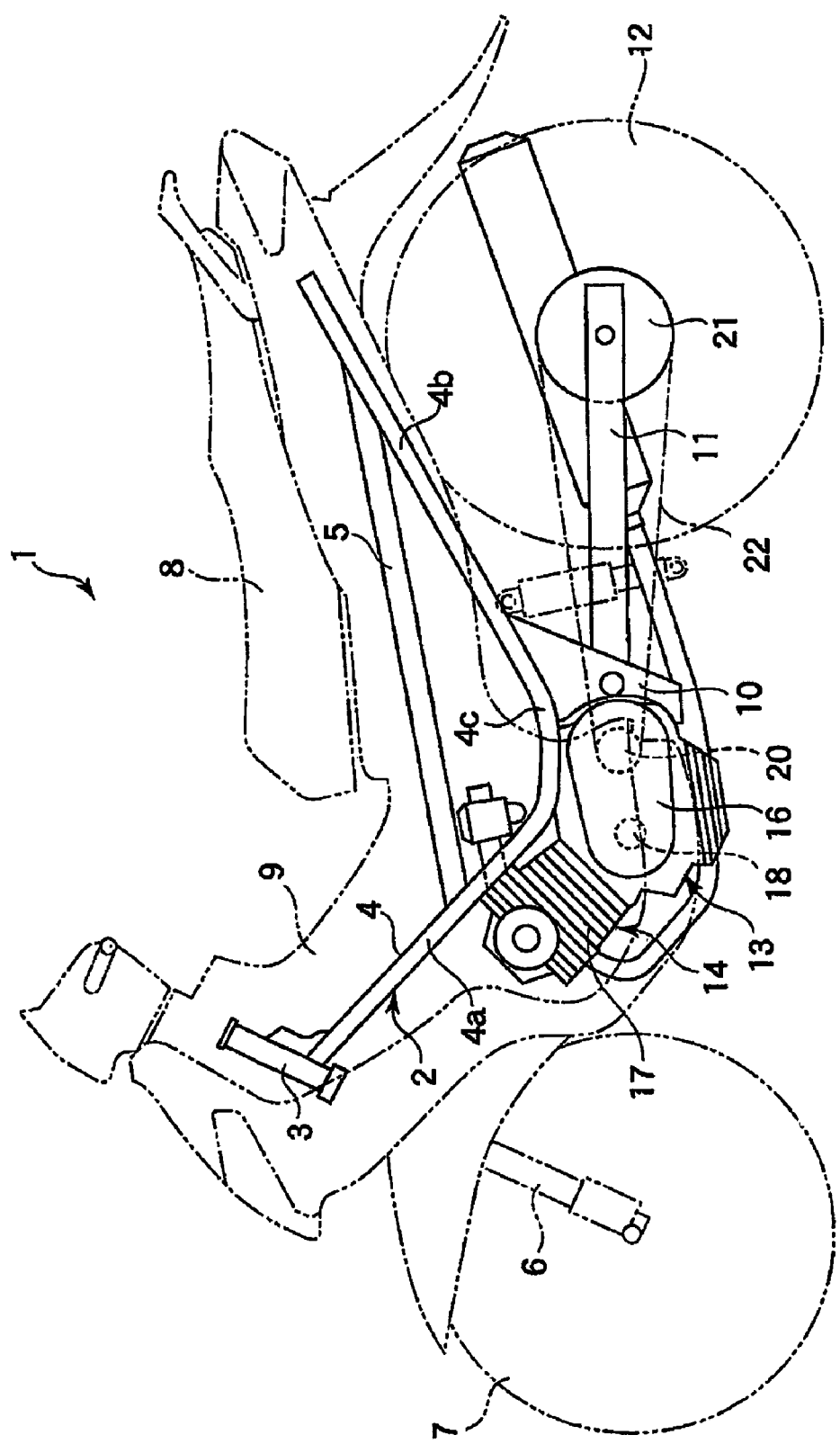

[Fig. 2]
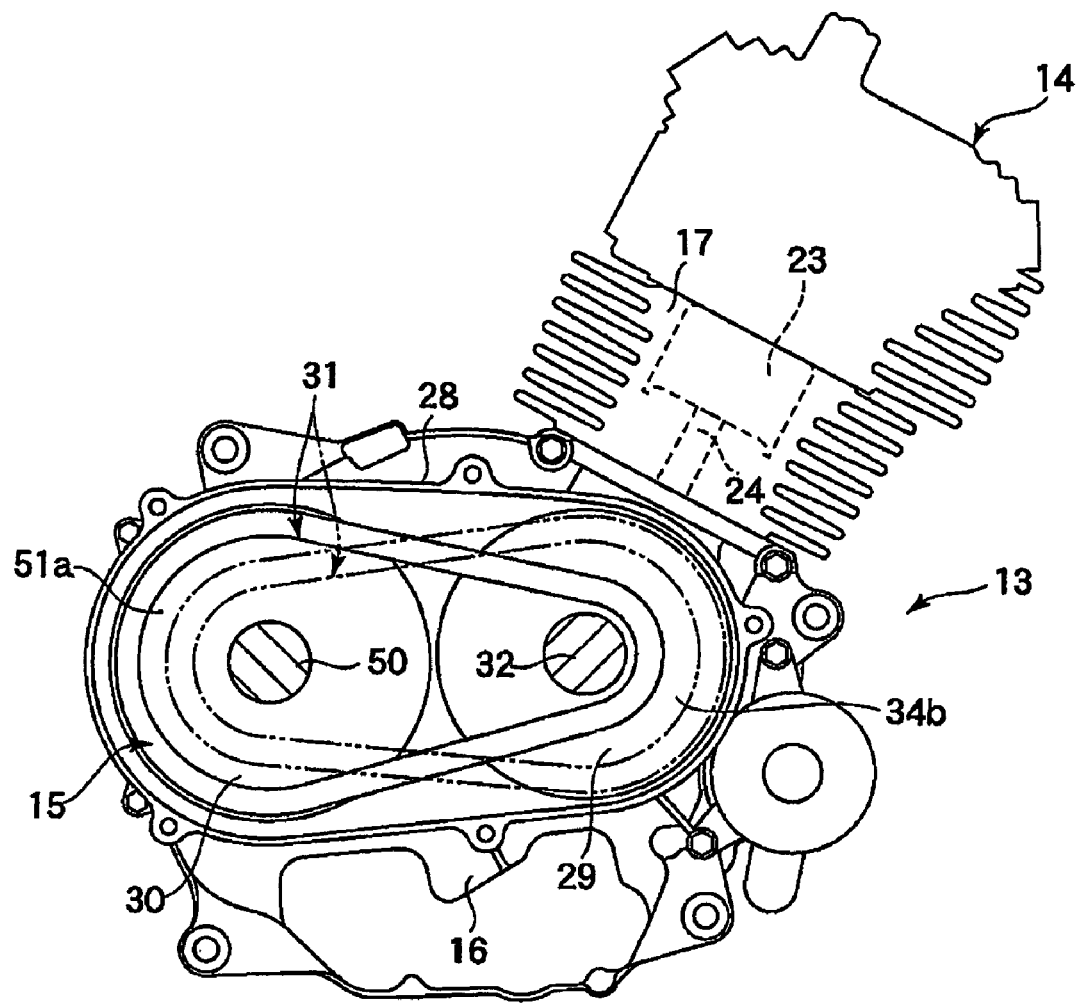

[Fig. 3]
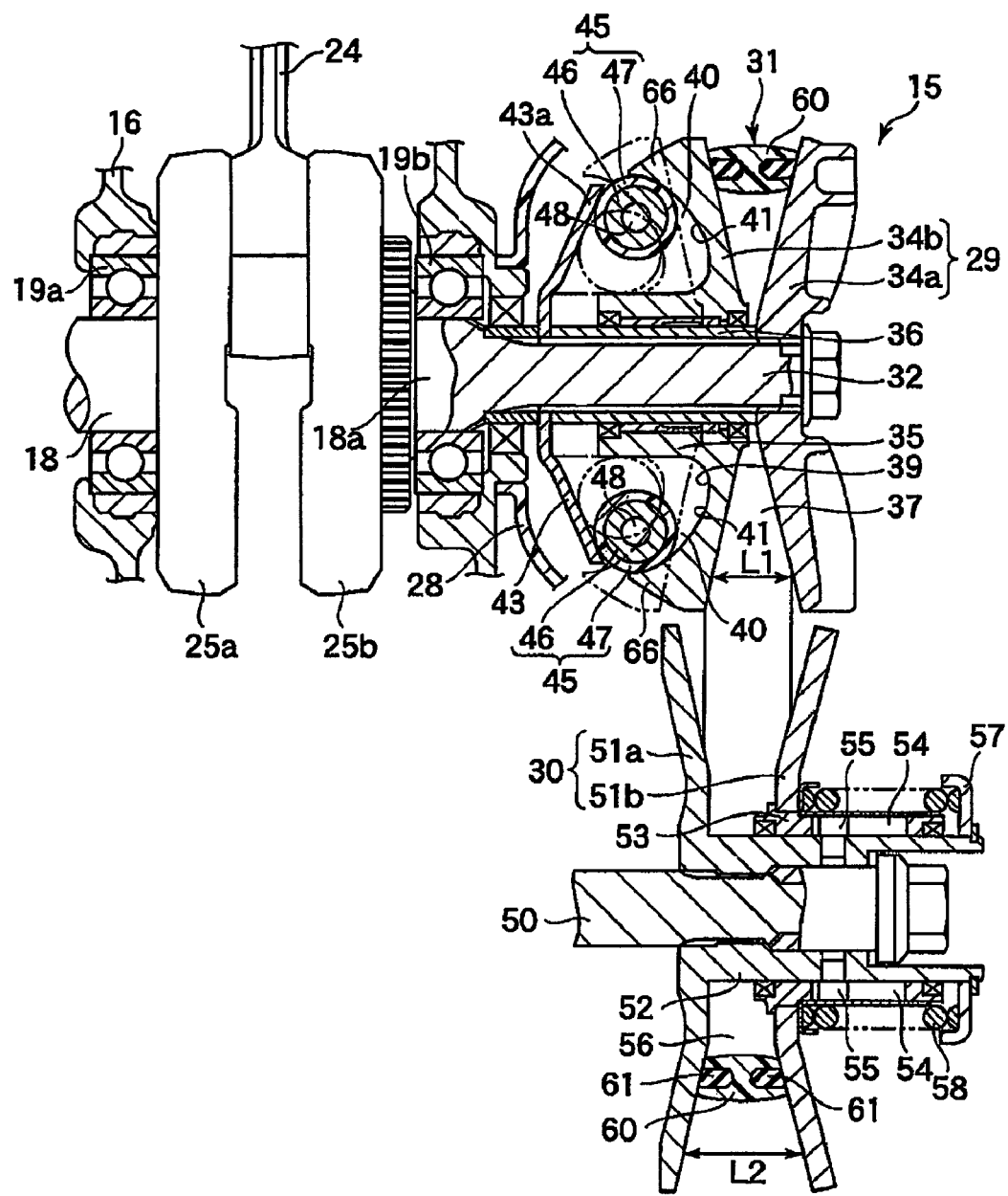

[Fig. 4]
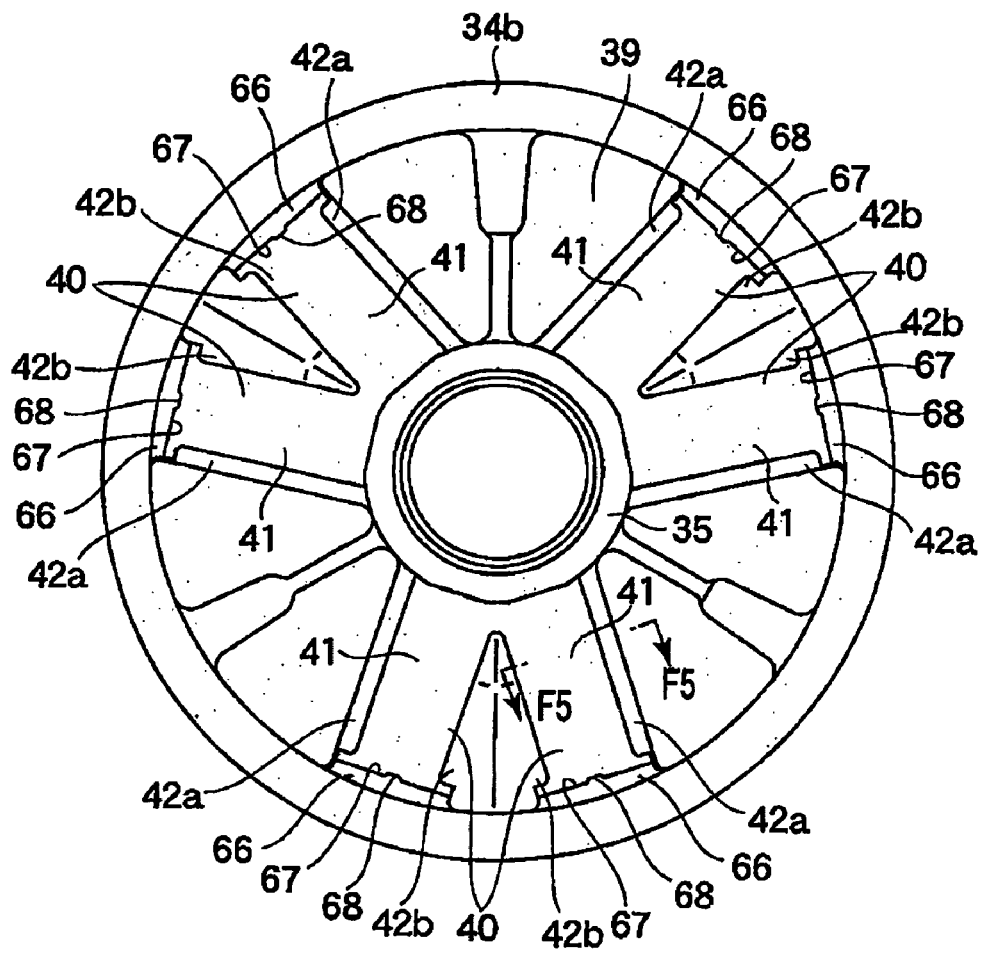
[Fig. 5]
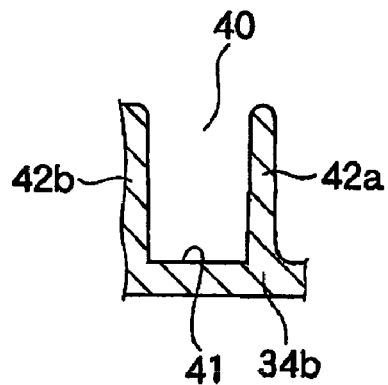

[Fig. 6]
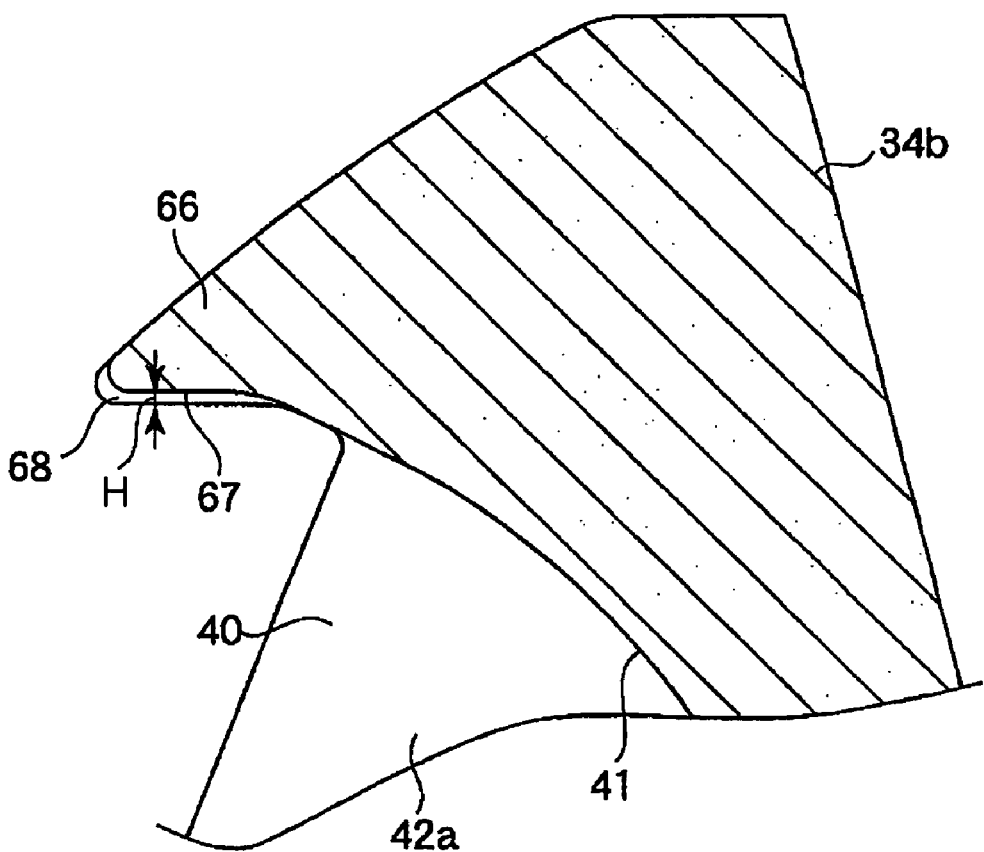
[Fig. 7]
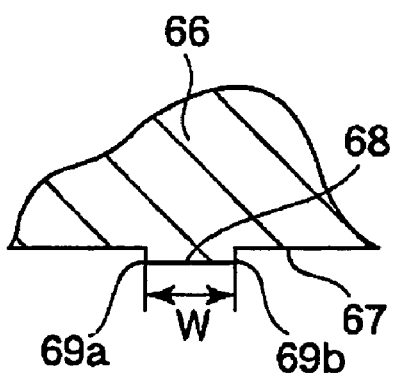

[Fig. 8]
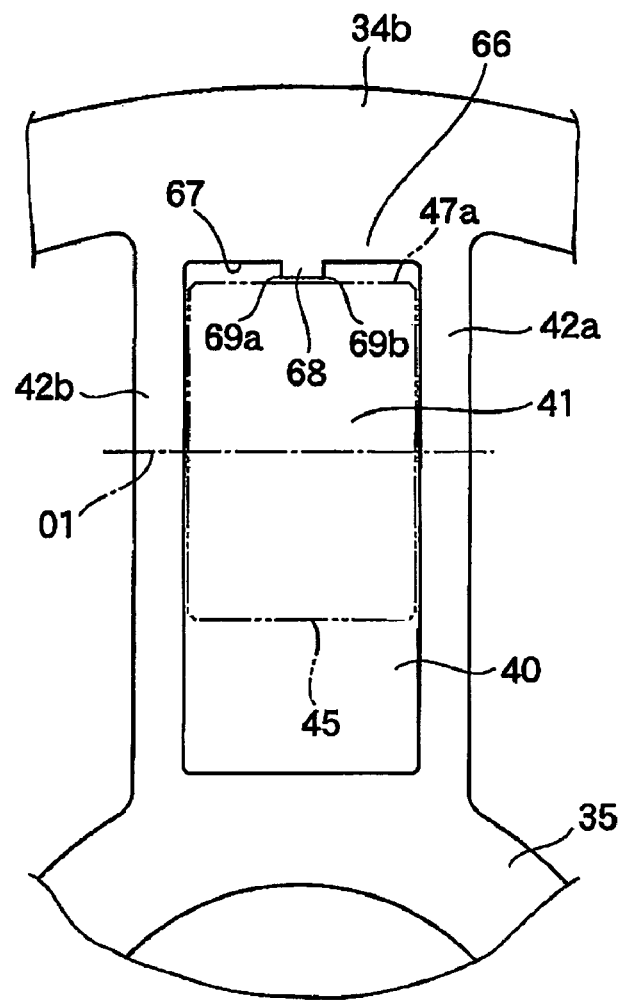
[Fig. 9]
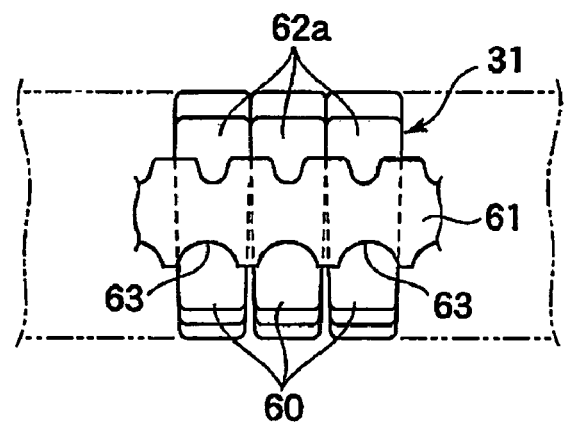

[Fig. 10]
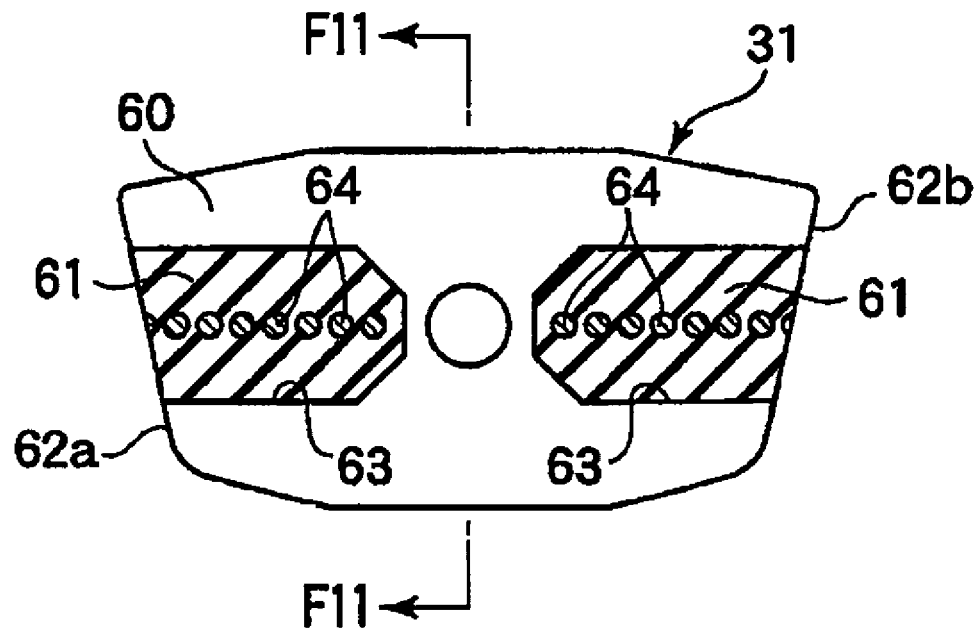
[Fig. 11]
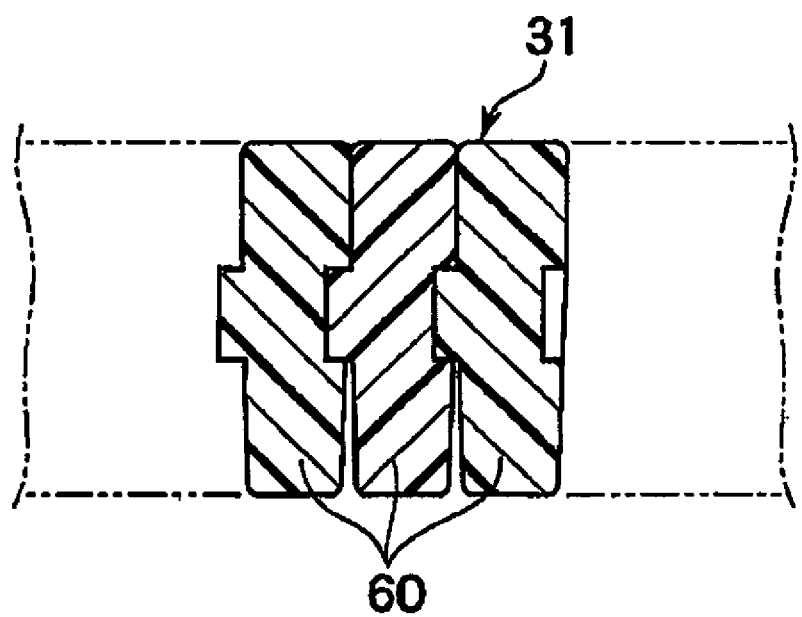

[Fig. 12]
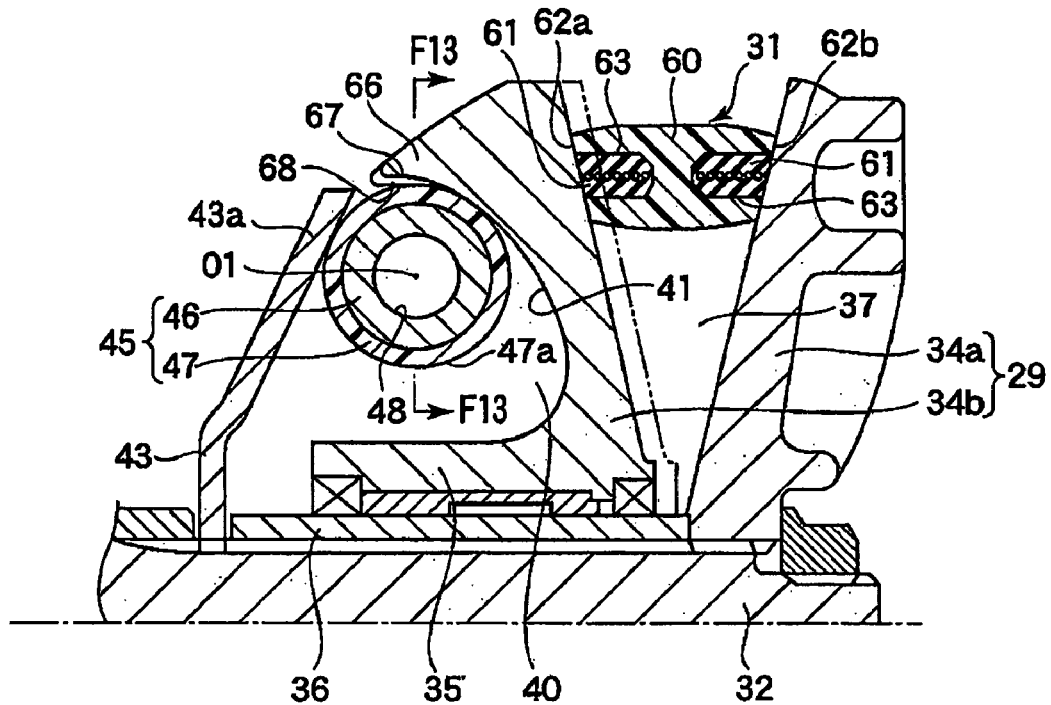
[Fig. 13]
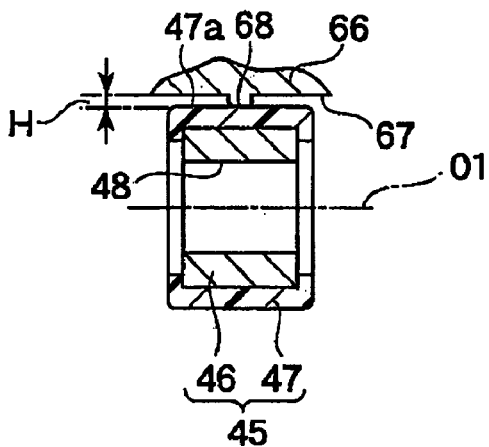

[Fig. 14]
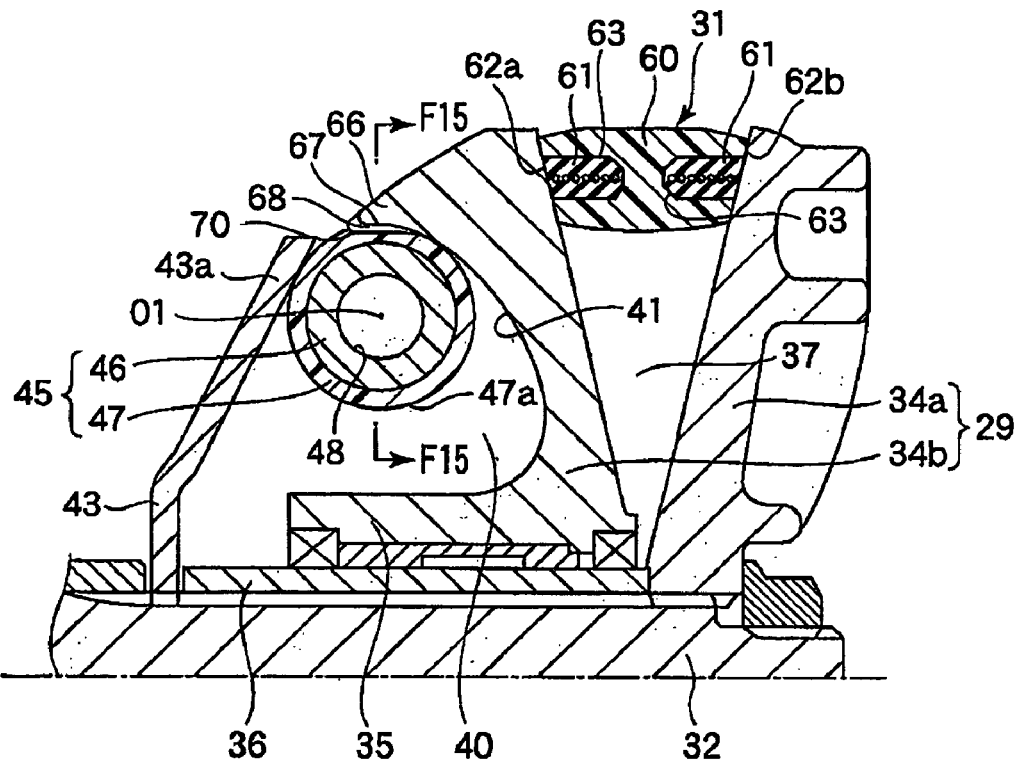
[Fig. 15]
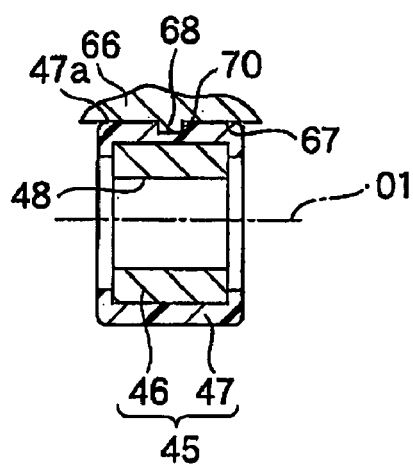

[Fig. 16]
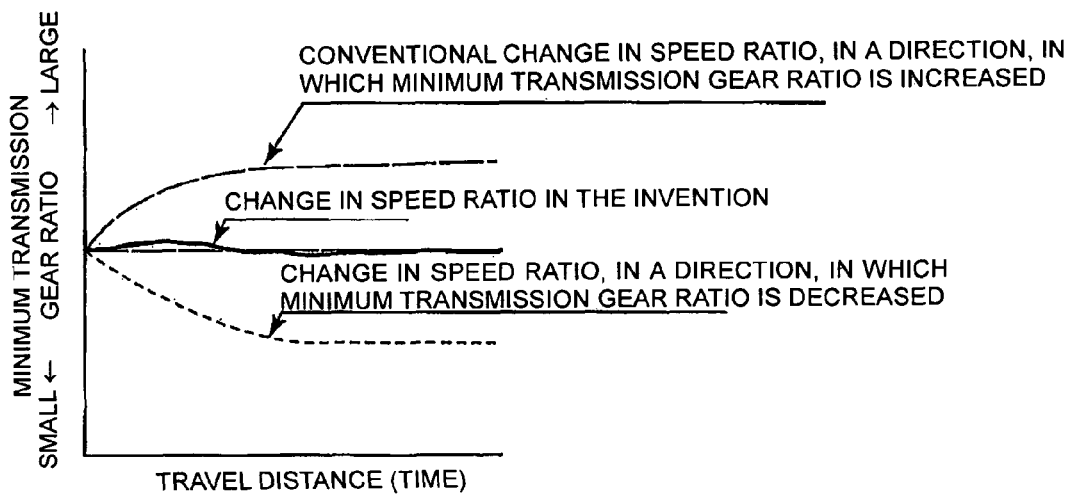
[Fig. 17]
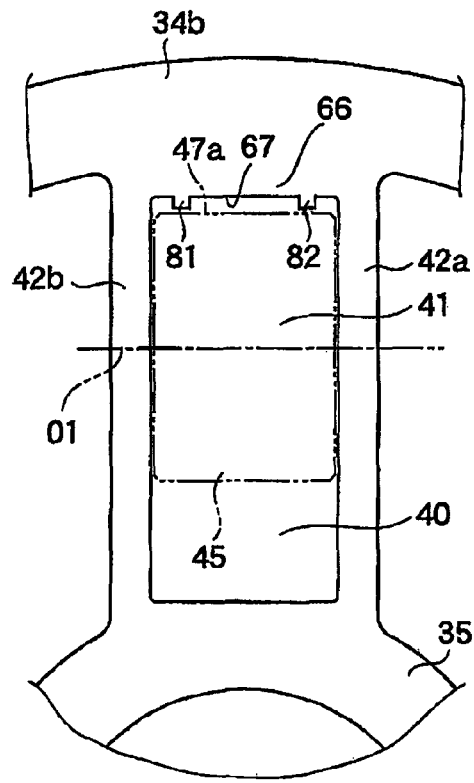

[Fig. 18]
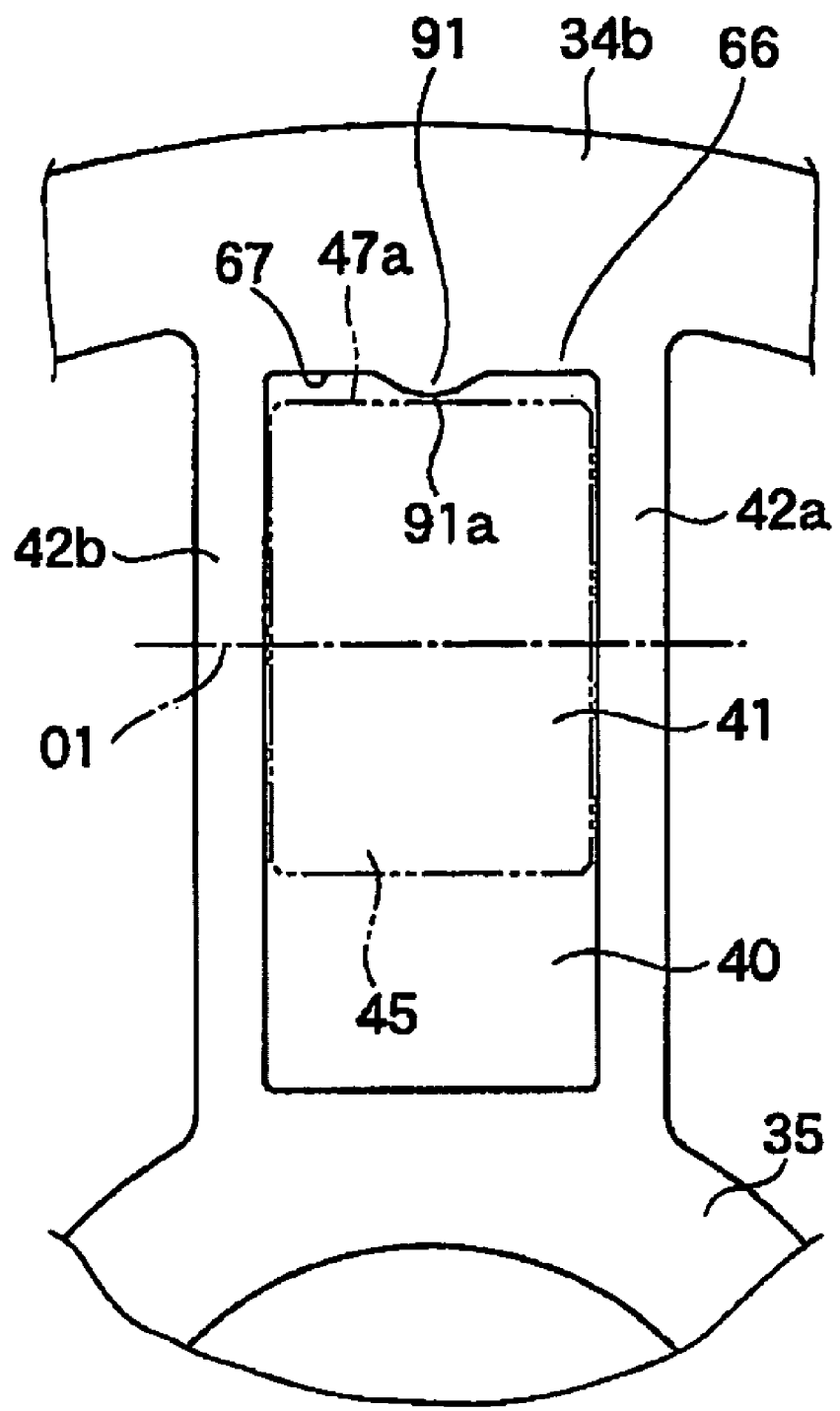

[Fig. 19]
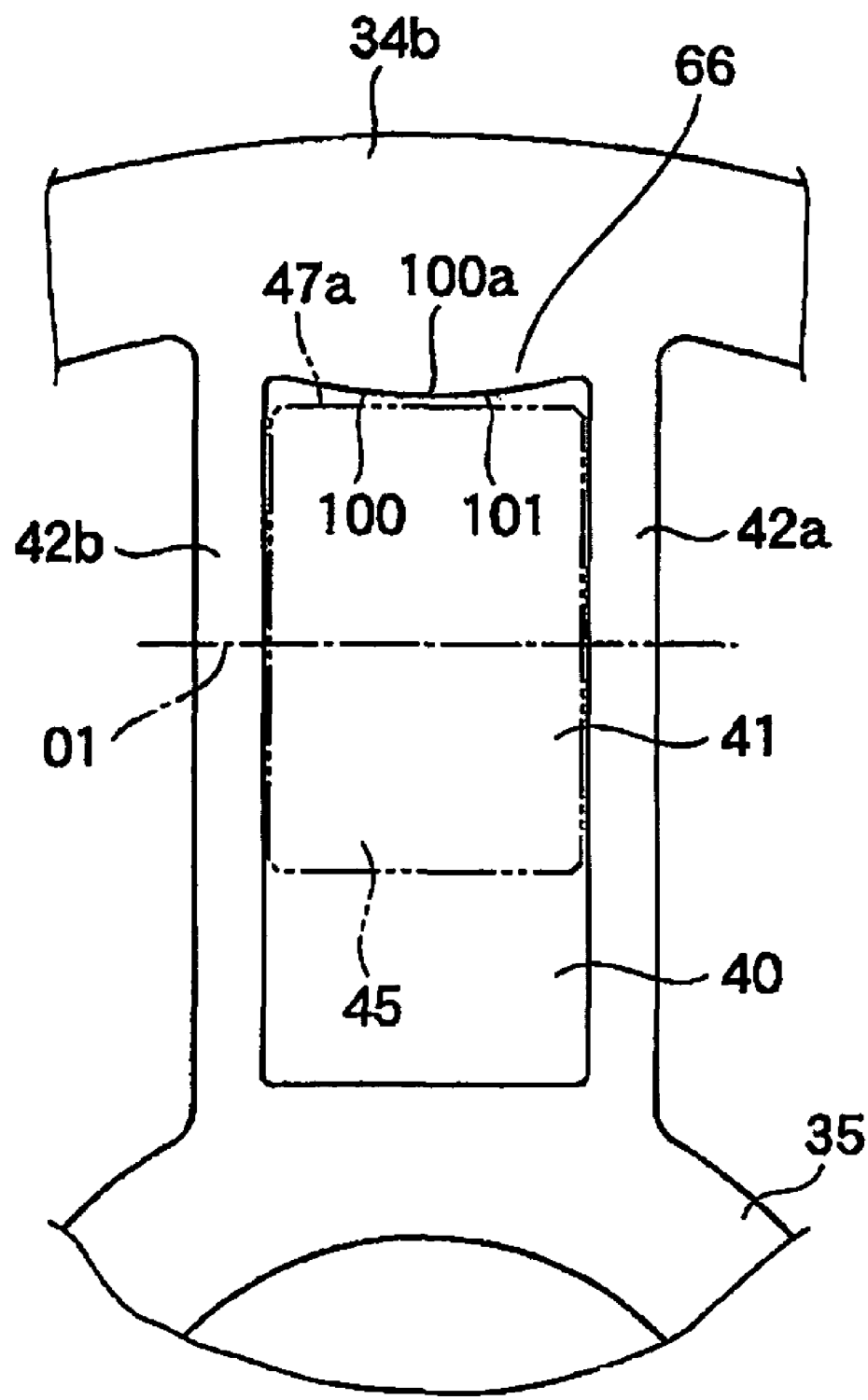

[Fig. 20]
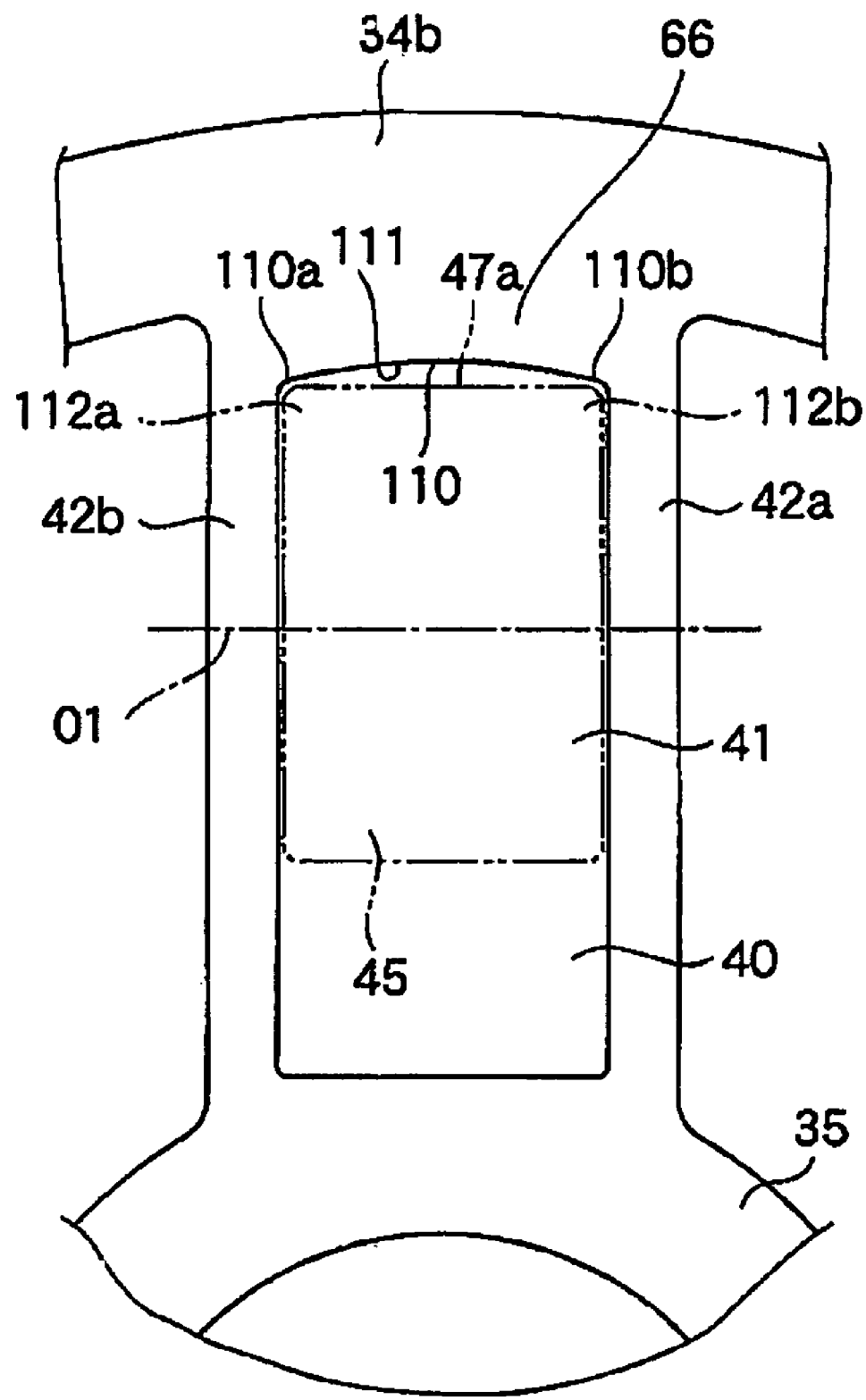

[Fig. 21]
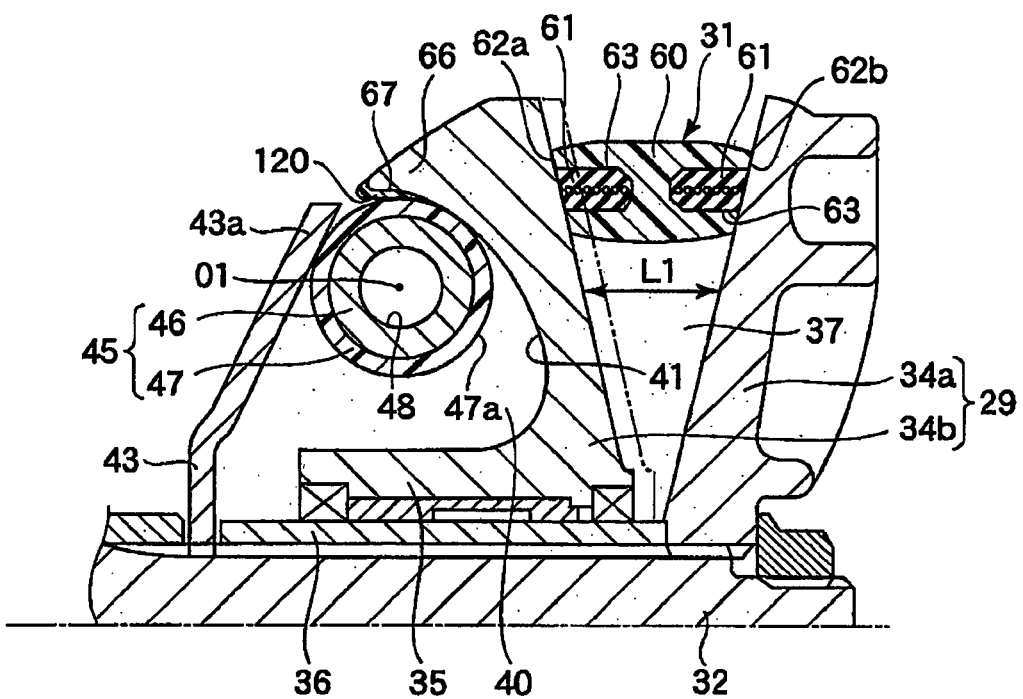
[Fig. 22]
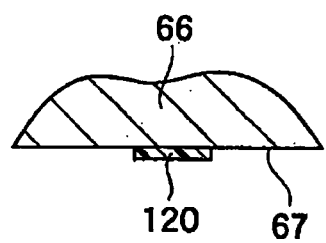

[Fig. 23]
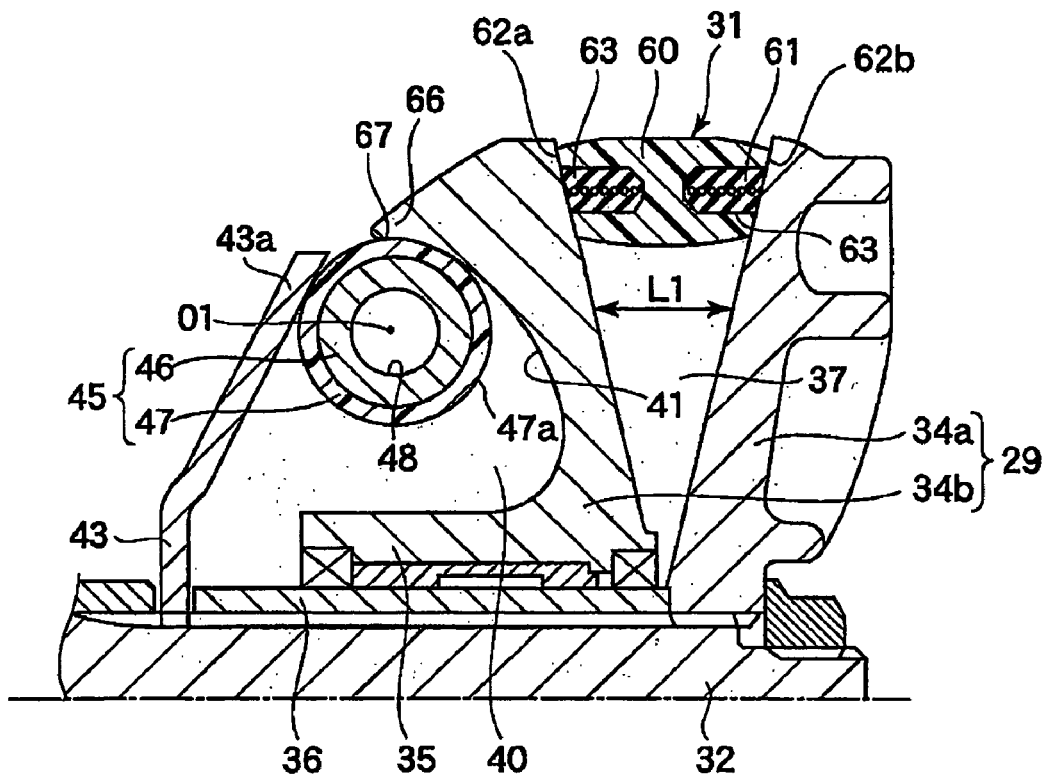
[Fig. 24]
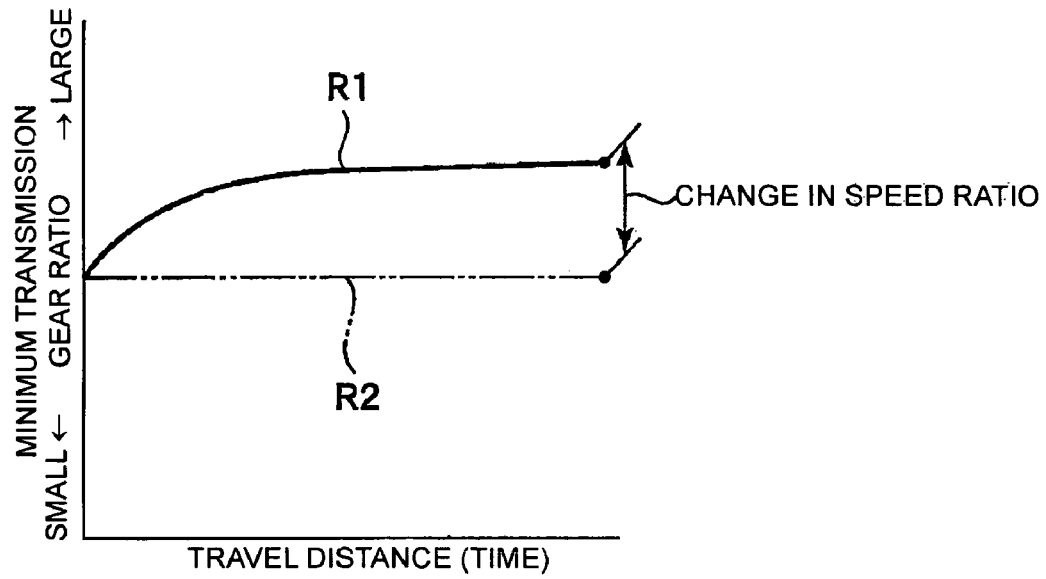

BELT TYPE CONTINUOUS VARIABLE TRANSMISSION, POWER UNIT HAVING THE BELT TYPE CONTINUOUS VARIABLE TRANSMISSION, VEHICLE MOUNTING THEREON THE BELT TYPE CONTINUOUS VARIABLE TRANSMISSION, AND SHEAVE FOR CONTINUOUS VARIABLE TRANSMISSION

TECHNICAL FIELD

The present invention relates to a belt type continuous variable transmission, in which torque is transmitted to a secondary sheave from a primary sheave through an endless belt, and a sheave for continuous variable transmissions, and more particular, to a construction for prevention of a change in speed ratio at a minimum transmission gear ratio. Further, the invention relates to a power unit, in which, for example, an engine and a belt type continuous variable transmission are combined with each other, and a vehicle, such as motorcycles, mounting thereon a belt type continuous variable transmission.

BACKGROUND ART

For example, scooter type motorcycles mount thereon a belt type continuous variable transmission, of which transmission gear ratio can be adjusted in a stepless manner according to a traveling state. Belt type continuous variable transmissions comprise a primary sheave, a secondary sheave, and a belt. The belt is entrained between the primary sheave and the secondary sheave in an endless manner.

The primary sheave comprises a stationary sheave body and a movable sheave body, which are opposed to each other, and receives torque transmitted from an engine to be rotated. The movable sheave body is slidable in a direction toward and away from the stationary sheave body, and a belt groove is defined between the movable sheave body and the stationary sheave body to permit the belt to be entrained therein.

Further, the primary sheave comprises a cam plate and a plurality of roller weights. The cam plate is opposed to the movable sheave body. The roller weights are interposed between the cam plate and the movable sheave body so as to rotate together with the movable sheave body. The roller weights are aligned at intervals circumferentially of the movable sheave body, and movable radially of the movable sheave body.

The secondary sheave interlocks with a rear wheel of a motorcycle through a speed reducer. The secondary sheave comprises a stationary sheave body and a movable sheave body, which are opposed to each other. The movable sheave body is slidable in a direction toward and away from the stationary sheave body, and a belt groove is defined between the movable sheave body and the stationary sheave body to permit the belt to be entrained therein. The movable sheave body is biased by a spring in a direction, in which the belt groove is decreased in width.

When the primary sheave is increased in rotating speed, the roller weights move radially outwardly of the movable sheave body according to centrifugal forces generated upon rotation of the movable sheave body. Such movements cause the movable sheave body to be pushed by the roller weights to slide toward the stationary sheave body. Therefore, the belt groove on the primary sheave is decreased in width, so that the belt interposed between the stationary sheave body and the movable sheave body is pushed out radially outwardly of the primary sheave. Accordingly, a diameter, at which the belt is entrained about the primary sheave, is increased.

In contrast, with the secondary sheave, the belt is pulled toward a center of rotation of the secondary sheave. Thereby, the movable sheave body slides against the bias of the spring in a direction away from the stationary sheave body. As a result, the belt groove is enlarged in width, and a diameter, at which the belt is entrained about the secondary sheave, is decreased. Therefore, the belt type continuous variable transmission is decreased in transmission gear ratio. The transmission gear ratio becomes minimum when a diameter, at which the belt is entrained about the primary sheave, becomes maximum.

With conventional belt type continuous variable transmissions, a minimum transmission gear ratio is determined by restricting positions of roller weights relative to a primary sheave. Stated specifically, a movable sheave body of the primary sheave comprises a plurality of stoppers that project toward an outer periphery of a cam plate. The stoppers come into contact with outer peripheral surfaces of the roller weights when the movable sheave body is slid to a position, in which a belt groove is made smallest in width. Such contact restricts movements of the roller weights caused by centrifugal forces, and thus a width of the belt groove and a diameter, at which the belt is entrained about the primary sheave, are determined to obtain a minimum transmission gear ratio. For example, JP-A-2001-248698 discloses a belt type continuous variable transmission provided with a primary sheave, which comprises such stoppers.

With the belt type continuous variable transmission disclosed in the patent document, roller weights are pushed against outer peripheries of a movable sheave body and a cam plate in that operating state, in which a transmission gear ratio becomes minimum. Generally, roller weights are made of a softer material than a movable sheave body and a cam plate. Therefore, when fresh roller weights are repeatedly pushed against the movable sheave body and the cam plate, those portions of outer peripheral surfaces of the roller weights, which contact with the movable sheave body and the cam plate, begin wear.

When the roller weights have worn, the movable sheave body shifts in a direction toward the cam plate. In other words, the movable sheave body cannot be pushed toward a stationary sheave body by an amount, by which the roller weights have worn, so that a belt groove on a primary sheave is increased in width. Accordingly, a diameter, at which the belt is entrained about the primary sheave, changes in a direction, in which a transmission gear ratio is increased, so that it is not possible to obtain a predetermined minimum transmission gear ratio.

FIG. 24 discloses a situation, in which speed ratio changes at a minimum transmission gear ratio in a conventional belt type continuous variable transmission. As apparent from FIG. 24, at a point of time when the travel distance of a motorcycle is 0 and roller weights are fresh, an actual minimum transmission gear ratio R1 of the belt type continuous variable transmission is maintained at a predetermined value R2. The minimum transmission gear ratio R1 changes in a direction of increasing speed ratio with the lapse of operating time. Further, the minimum transmission gear ratio R1 becomes stable at a point of time when pressures generated on contact portions of the roller weights and a movable sheave body and on contact portions of the roller weights and a cam plate reach certain values as the roller weights proceeds in the course of wear.

Accordingly, with conventional belt type continuous variable transmissions, it is not possible to avoid a change in speed ratio in a direction, in which a minimum transmission gear ratio is increased, caused by wear of roller weights. As a result, there is caused a problem of an increase in engine speed and a decrease in traveling speed of a motorcycle.

DISCLOSURE OF THE INVENTION

It is an object of the invention to provide a belt type continuous variable transmission capable of suppressing a change in speed ratio at a minimum transmission gear ratio to a small amount.

It is a further object of the invention to provide a power unit provided with a belt type continuous variable transmission, in which a change in speed ratio at a minimum transmission gear ratio is small.

It is a still further object of the invention to provide a vehicle mounting thereon a belt type continuous variable transmission, in which a change in speed ratio at a minimum transmission gear ratio is small.

It is a further object of the invention to provide a sheave for continuous variable transmissions, which is capable of suppressing a change in speed ratio at a minimum transmission gear ratio to a small amount.

In order to attain the object, a belt type continuous variable transmission according to an embodiment of the invention comprises a primary sheave that outputs torque, a secondary sheave that receives torque from the primary sheave and a belt entrained between the primary sheave and the secondary sheave in an endless manner to transmit torque to the secondary sheave from the primary sheave.

The primary sheave comprise a first sheave body, a second sheave body provided to be relatively slidable in a direction toward and away from the first sheave body and forming between it and the first sheave body a belt groove, about which the belt is entrained, a plurality of push bodies that rotate together with the second sheave body and move radially of the second sheave body according to centrifugal forces generated at the time of rotation of the second sheave body, such movements causing the second sheave body to slide to change a width of the belt groove, and a plurality of stoppers that restrict movements of the push bodies by contacting with outer surfaces of the push bodies when the second sheave body reaches a position of minimum transmission gear ratio, in which the belt groove is made smallest in width, the stoppers being shaped to accelerate partial wear of the outer surfaces of the push bodies.

In order to attain the object, a power unit according to an embodiment of the invention comprises a drive source and a belt type continuous variable transmission interlocking with the drive source. The belt type continuous variable transmission comprises a primary sheave that outputs torque transmitted from the drive source, a secondary sheave that receives torque from the primary sheave, and a belt entrained between the primary sheave and the secondary sheave in an endless manner. The primary sheave comprises a first sheave body, a second sheave body provided to be relatively slidable in a direction toward and away from the first sheave body and forming between it and the first sheave body a belt groove, about which the belt is entrained, a plurality of push bodies that rotate together with the second sheave body and move radially of the second sheave body according to centrifugal forces generated at the time of rotation of the second sheave body, such movements causing the second sheave body to slide to change a width of the belt groove, and a plurality of stoppers that restrict movements of the push bodies by contacting with outer surfaces of the push bodies when the second sheave body reaches a position of minimum transmission gear ratio, in which the belt groove is made smallest in width, the stoppers being shaped to accelerate partial wear of the outer surfaces of the push bodies.

In order to attain the object, a vehicle according to an embodiment of the invention comprises a frame, a drive source supported on the frame, and a belt type continuous variable transmission interlocking with the drive source. The belt type continuous variable transmission comprises a primary sheave that outputs torque transmitted from the drive source, a secondary sheave that receives torque from the primary sheave, and a belt entrained between the primary sheave and the secondary sheave in an endless manner.

The primary sheave comprises a first sheave body, a second sheave body provided to be relatively slidable in a direction toward and away from the first sheave body and forming between it and the first sheave body a belt groove, about which the belt is entrained, a plurality of push bodies that rotate together with the second sheave body and move radially of the second sheave body according to centrifugal forces generated at the time of rotation of the second sheave body, such movements causing the second sheave body to slide to change a width of the belt groove, and a plurality of stoppers that restrict movements of the push bodies by contacting with outer surfaces of the push bodies when the second sheave body reaches a position of minimum transmission gear ratio, in which the belt groove is made smallest in width, the stoppers being shaped to accelerate partial wear of the outer surfaces of the push bodies.

In order to attain the object, a sheave for continuous variable transmissions, according to an embodiment of the invention, comprises a first sheave body, a second sheave body that forms between it and the first sheave body a belt groove, about which a belt is entrained. The second sheave body is enabled by a push body, which moves radially of the second sheave body according to centrifugal forces generated at the time of rotation of the second sheave body, to relatively slide in a direction toward and away from the first sheave body. Further, the second sheave body comprises a stopper that restricts movements of the push body by contacting with an outer surface of the push body when slid to a position of minimum transmission gear ratio, in which the belt groove is made smallest in width. The stopper is shaped to accelerate partial wear of the outer surface of the push body.

According to an embodiment of the invention, when the push bodies are applied by centrifugal forces to be pushed against the stoppers, only parts of the outer surfaces of the push bodies wear positively. Due to such wear, the push bodies bite into the stoppers and move radially outwardly of the second sheave body.

As a result, the belt groove is narrowed to cause a change in speed ratio in a direction, in which a decrease in transmission gear ratio is caused. In other words, it is possible to compensate for a variation in speed ratio in a direction, in which an increase in transmission gear ratio is caused. Accordingly, it is possible to suppress a change in speed ratio at a minimum transmission gear ratio to a small amount with simple measures, in which the stoppers are simply changed in shape.

BRIEF DESCRIPTION OF THE DRAWINGS

FIG. 1 is a side view showing a motorcycle, according to a first embodiment of the invention, with a belt type continuous variable transmission mounted thereon.

FIG. 2 is a side view showing a power unit, according to the first embodiment of the invention, in which a 4-cycle engine and a belt type continuous variable transmission are combined together.

FIG. 3 is a cross sectional view showing the belt type continuous variable transmission according to the first embodiment of the invention.

FIG. 4 is a front view showing a second sheave body in the first embodiment of the invention.

FIG. 5 is a cross sectional view taken along the line F5-F5 in FIG. 4.

FIG. 6 is a cross sectional view showing, in enlarged scale, a stopper on the second sheave body in the first embodiment of the invention.

FIG. 7 is a cross sectional view showing the stopper in the first embodiment of the invention.

FIG. 8 is a front view schematically showing the positional relationship between a roller weight and a projection on the stopper in the first embodiment of the invention.

FIG. 9 is a side view showing a belt used for the belt type continuous variable transmission according to the first embodiment of the invention.

FIG. 10 is a cross sectional view showing the belt used for the belt type continuous variable transmission according to the first embodiment of the invention.

FIG. 11 is a cross sectional view taken along the line F11-F11 in FIG. 10.

FIG. 12 is a cross sectional view showing a primary sheave in a state, in which a fresh roller weight contacts with the projection on the stopper, in the first embodiment of the invention.

FIG. 13 is a cross sectional view taken along the line F13-F13 in FIG. 12.

FIG. 14 is a cross sectional view showing the primary sheave in a state, in which the roller weight bites into the projection on the stopper, in the first embodiment of the invention.

FIG. 15 is a cross sectional view taken along the line F15-F15 in FIG. 14.

FIG. 16 is a view showing characteristics representative of changes in speed ratio at a minimum transmission gear ratio in the first embodiment of the invention.

FIG. 17 is a front view schematically showing the positional relationship between a roller weight and a projection on a stopper in a second embodiment of the invention.

FIG. 18 is a front view schematically showing the positional relationship between a roller weight and a projection on a stopper in a third embodiment of the invention.

FIG. 19 is a front view schematically showing the positional relationship between a roller weight and a projection on a stopper in a fourth embodiment of the invention.

FIG. 20 is a front view schematically showing the positional relationship between a roller weight and a projection on a stopper in a fifth embodiment of the invention.

FIG. 21 is a cross sectional view showing a primary sheave in a state, in which a fresh roller weight contacts with a first contact portion on a stopper, in a sixth first embodiment of the invention.

FIG. 22 is a cross sectional view showing the stopper of a second sheave body according to the sixth embodiment of the invention.

FIG. 23 is a cross sectional view showing the primary sheave in a state, in which a roller weight contacts with a second contact portion on the stopper, in the sixth first embodiment of the invention.

FIG. 24 is a view showing characteristics representative of changes in speed ratio at a minimum transmission gear ratio in a conventional belt type continuous variable transmission.

BEST MODE FOR CARRYING OUT THE INVENTION

A first embodiment of the invention will be described below with reference to FIGS. 1 to 16.

FIG. 1 discloses a motorcycle 1 exemplary of a vehicle according to the invention. The motorcycle 1 comprises a frame 2. The frame 2 includes a steering head pipe 3, a pair of main pipes 4 (only one of them is shown), and a pair of seat rails 5 (only one of them is shown). The steering head pipe 3 is positioned at a front end of the frame 2 and supports a front wheel 7 through a front fork 6.

The respective main pipes 4 extend rearward from the steering head pipe 3. The main pipes 4 comprise a front half 4a, a rear half 4b, and an intermediate portion 4c. The front half 4a extends obliquely downward from the steering head pipe 3. The rear half 4b extends obliquely upward from a lower end of the front half 4a. The intermediate portion 4c is positioned between the front half 4a and the rear half 4b.

The seat rail 5 bridges between the front half 4a and the rear half 4b of the main pipe 4. The seat rails 5 support a seat 8. A vehicle body cover 9 covers the frame 2. The vehicle body cover 9 is contiguous to a lower end of the seat 8.

A rear arm bracket 10 is fixed to the intermediate portion 4c of each of the main pipes 4. The rear arm bracket 10 projects downward from the intermediate portion 4c of the main pipe 4. The rear arm bracket 10 supports a rear arm 11. The rear arm 11 projects rearward from the rear arm bracket 10. A rear wheel 12 is supported on a rear end of the rear arm 11.

The frame 2 supports a power unit 13 that drives the rear wheel 12. As shown in FIGS. 1 and 2, the power unit 13 comprises a 4-cycle single-cylinder engine 14 exemplary of drive sources, and a belt type continuous variable transmission 15. A lower portion of the vehicle body cover 9 covers the power unit 13.

The engine 14 is suspended from the front halves 4a of the main pipes 4. The engine 14 comprises a crankcase 16 and a cylinder 17 connected to the crankcase 16.

The crankcase 16 accommodates therein a crank shaft 18 and a gear reducer (not shown). As shown in FIG. 3, the crank shaft 18 is supported on the crankcase 16 through bearings 19a, 19b and arranged horizontally widthwise of the motorcycle 1. The gear reducer has a drive sprocket 20 (shown in FIG. 1) at an output end thereof. The drive sprocket 20 is positioned rearwardly of the crank shaft 18. A length of chain 22 is entrained about the drive sprocket 20 and a driven sprocket 21 of the rear wheel 12.

The cylinder 17 of the engine 14 projects upward along the front halves 4a of the main pipes 4 from the crankcase 16. The cylinder 17 accommodates therein a piston 23. The piston 23 is connected to crank webs 25a, 25b of the crank shaft 18 through a connecting rod 24.

As shown in FIGS. 2 and 3, the belt type continuous variable transmission (referred below to as CVT) 15 is positioned on the right of the crankcase 16. The CVT 15 is accommodated in a transmission case 28. The transmission case 28 is fixed to a right side of the crankcase 16.

The CVT 15 comprises a primary sheave 29, a secondary sheave 30, and a belt 31. The primary sheave 29 outputs torque transmitted from the crank shaft 18. The primary sheave 29 is positioned at a front end of the transmission case 28 and supported on an input shaft 32. The input shaft 32 is unified with the crank shaft 18. In other words, a journal 18a positioned at a right end of the crank shaft 18 includes an extension extended toward the front end of the transmission case 28, the extension serving as the input shaft 32.

The primary sheave 29 comprises a first sheave body 34a and a second sheave body 34b. Used for the first sheave body 34a is chrome molybdenum steel having been subjected to, for example, carburizing/temper treatment. The second sheave body 34b comprises a die-cast molding, and uses, for example, die-cast aluminum alloy.

The first sheave body 34a is fixed to a shaft end of the input shaft 32 to rotate together with the input shaft 32. The second sheave body 34b has a cylindrical-shaped boss 35 at a center of rotation thereof. The boss 35 is supported on the input shaft 32 through a collar 36. Therefore, the second sheave body 34b is slidable in a direction toward and away from the first sheave body 34a and rotatable circumferentially of the input shaft 32.

The first sheave body 34a and the second sheave body 34b are opposed to each other on the input shaft 32. A first belt groove 37 is formed between the first sheave body 34a and the second sheave body 34b. The first belt groove 37 has a V-shaped cross section. The second sheave body 34b slides to be able to adjust a width L1 of the first belt groove 37.

As shown in FIGS. 3 and 4, the second sheave body 34b includes a back surface 39 positioned on an opposite side to the first sheave body 34a. A plurality of guides 40 are formed on the back surface 39 of the second sheave body 34b. The guides 40 extend radially of the second sheave body 34b from an outer peripheral surface of the boss 35.

As shown in FIG. 5, the respective guides 40 comprise a cam surface 41 and a pair of guide walls 42a, 42b. The cam surface 41 extends radially outwardly of the second sheave body 34b from the outer peripheral surface of the boss 35, and is inclined in a direction away from the first sheave body 34a as it goes radially outwardly of the second sheave body 34b.

The guide walls 42a, 42b stand upright from an edge of the cam surface 41 and extend radially of the second sheave body 34b. The guide walls 42a, 42b face each other at an interval with the cam surface 41 therebetween. Therefore, the guides 40 are grooved to be opened in opposition to the first sheave body 34a.

A metallic cam plate 43 is fixed to the input shaft 32. The cam plate 43 rotates together with the input shaft 32 and is opposed to the back surface 39 of the second sheave body 34b. The cam plate 43 and the second sheave body 34 bare movable in a direction toward and away from each other while rotating together. An outer periphery 43a of the cam plate 43 is inclined in a direction toward the back surface 39 of the second sheave body 34b.

A plurality of roller weights 45 are arranged between the second sheave body 34b and the cam plate 43. The roller weights 45 are exemplary of push bodies, and comprise, for example, a body 46 made of brass, and an outer ring 47 made off nylon to cover the body 46. The roller weights 45 are cylindrical-shaped and a through-hole 48 for weight adjustment is formed centrally of the body 46.

As shown schematically in FIG. 8, the roller weights 45 are accommodated in the guides 40 of the second sheave body 34b. The outer ring 47 of the roller weight 45 has an outer surface 47a exposed outside. The outer surface 47a is continuous circumferentially of the outer ring 47 and slidably contacts at two locations with the cam surface 41 and the cam plate 43. Further, the roller weight 45 has an end surface and the other end surface along an axial direction thereof. The end surface and the other end surface of the roller weight 45 slidably contact with the guide walls 42a, 42b of the guide 40. Thereby, the respective roller weights 45 are held between the second sheave body 34b and the cam plate 43 in a posture with its axis O1 perpendicular to the input shaft 32. Therefore, the roller weights 45 rotate together with the second sheave body 34b and are exerted by centrifugal forces that are generated by the rotation thereof.

According to the first embodiment, the first sheave body 34a is fixed to the input shaft 32 and only the second sheave body 34b is caused to slide axially of the input shaft 32. Even when both the first and second sheave bodies 34a, 34b are caused to slide axially of the input shaft 32, however, it is possible to vary the width of the first belt groove 37.

The secondary sheave 30 is applied by torque output from the primary sheave 29. As shown in FIG. 3, the secondary sheave 30 is positioned at a rear end of the transmission case 28 and supported on an output shaft 50. The output shaft 50 is parallel to the input shaft 32 and connected to an input end of the gear reducer through an automatic centrifugal clutch (not shown).

The secondary sheave 30 comprises a first sheave body 51a and a second sheave body 51b. The first sheave body 51a has a cylindrical-shaped collar 52 at a center of rotation thereof. The collar 52 meshes with an outer peripheral surface of the output shaft 50. This mesh causes the first sheave body 51a and the output shaft 50 to rotate together.

The second sheave body 51b has a sleeve 53 at a center of rotation thereof. The sleeve 53 is mounted on the collar 52 to be axially slidable. A plurality of engagement grooves 54 are formed on the sleeve 53. The engagement grooves 54 extend axially of the sleeve 53 and are aligned at intervals circumferentially of the sleeve 53.

The collar 52 has a plurality of engagement pins 55. The engagement pins 55 project outside the collar 52 and are fitted slidably into the engagement grooves 54 of the sleeve 53. Thereby, the first sheave body 51a and the second sheave body 51b are made movable in a direction toward and away from each other while rotating together.

The first sheave body 51a and the second sheave body 51b are opposed to each other on the output shaft 50. A second belt groove 56 is formed between the first sheave body 51a and the second sheave body 51b. The second belt groove 56 has a V-shaped cross section. The second sheave body 51b slides to be able to adjust a width L2 of the second belt groove 56.

A spring bearing 57 is fixed to an end of the collar 52. The spring bearing 57 is opposed to the second sheave body 51b. A compression coil spring 58 is interposed between the spring bearing 57 and the second sheave body 51b. The spring 58 biases the second sheave body 51b toward the first sheave body 51a.

The belt 31 serves to transmit torque to the secondary sheave 30 from the primary sheave 29. The belt 31 is entrained in an endless manner between the first belt groove 37 of the primary sheave 29 and the second belt groove 56 of the secondary sheave 30.

As shown in FIGS. 9 to 11, the belt 31 comprises a plurality of block pieces 60 and a pair of connecting bodies 61. For example, polyamide resin is used as a basic material for the block pieces 60. Aramid fibers are mixed as reinforcing materials in the basic material. Polyamide resin is high in thermal resistance, resisting to repeated impact load, and can preserve stable properties over a long term. Aramid fibers possess high strength and thermal resistance in combination. Accordingly, the block pieces 60 are excellent in thermal resistance, wear resistance, and fatigue resistance.

The respective block pieces 60 have a pair of side surfaces 62a, 62b that contact with the primary sheave 29 and the secondary sheave 30. The side surfaces 62a, 62b of the respective block pieces 60 are formed centrally thereof with recesses 63.

The connecting bodies 61 are made of, for example, super heat-resistant rubber. A plurality of core wires 64 for reinforcement are embedded in interiors of the connecting bodies 61. The connecting bodies 61 are annular in shape and fitted into the recesses 63 of the block pieces 60. Owing to such fitting, the plurality of block pieces 60 are connected together to constitute the endless belt 31. The belt 31 of this type has such a property that elongation of about 0.4% is generated in the initial stage of use but little dimensional change is shown thereafter.

In a state, in which the crank shaft 18 is low in rotating speed, as when the engine 14 performs idling operation, the roller weights 45 come toward a center of rotation of the primary sheave 29. Therefore, the second sheave body 34b is positioned most distant from the first sheave body 34a, and the width L1 of the first belt groove 37 becomes maximum. Accordingly, the belt 31 entrained about the first belt groove 37 is positioned at the center of rotation of the primary sheave 29, and a diameter, at which the belt 31 is entrained about the primary sheave 29, becomes minimum.

In contrast, with the secondary sheave 30, the second sheave body 51b is biased toward the first sheave body 51a by the spring 58, and the width L2 of the second belt groove 56 becomes minimum. Therefore, the belt 31 entrained about the second belt groove 56 is pushed out to an outer periphery of the secondary sheave 30, and a diameter, at which the belt 31 is entrained about the secondary sheave 30, becomes maximum. Accordingly, the CVT 15 becomes maximum in transmission gear ratio.

As the crank shaft 18 is increased in rotating speed, centrifugal forces applied on the roller weights 45 that rotate together the second sheave body 34b are increased. Thereby, the roller weights 45 begin moving radially outwardly of the second sheave body 34b. Since the roller weights 45 are interposed between the cam surfaces 41 and the cam plate 43, they move along the cam surfaces 41 and the cam plate 43 without rotating. Therefore, those portions of the outer surfaces 47a of the roller weights 45, which contact with the cam surfaces 41 and the cam plate 43, are liable to wear.

The cam surfaces 41, with which the outer surfaces 47a of the roller weights 45 contact, overhang in a manner to cover the roller weights 45 as they go radially outwardly of the second sheave body 34b. Likewise, the outer periphery 43a of the cam plate 43, with which the outer surfaces 47a of the roller weights 45 contact, is inclined toward the second sheave body 34b.

By virtue of this, the roller weights 45 are pushed toward the cam surfaces 41 as it they go radially outwardly of the second sheave body 34b. Such movements of the roller weights 45 cause the second sheave body 34b to slide toward the first sheave body 34a, and the width L1 of the first belt groove 37 is gradually decreased. As a result, the belt 31 interposed between the first sheave body 34a and the second sheave body 34b is pushed out radially outwardly of the primary sheave 29. Accordingly, a diameter, at which the belt 31 is entrained about the primary sheave 29, is increased.

Conversely, with the secondary sheave 30, the belt 31 is pulled toward the center of rotation of the secondary sheave 30. Thereby, the second sheave body 51b slides in a direction away from the first sheave body 51a against the bias of the spring 58, and so the width L2 of the second belt groove 56 is gradually increased. Therefore, a diameter, at which the belt 31 is entrained about the secondary sheave 30, is decreased. Accordingly, the CVT 15 is decreased in transmission gear ratio. The transmission gear ratio becomes minimum when a diameter, at which the belt 31 is entrained about the primary sheave 29, becomes maximum.

A minimum transmission gear ratio of the CVT 15 is determined by a position, to which the second sheave body 34b of the primary sheave 29 slides. In other words, a position of the second sheave body 34b when the CVT 15 is minimum in transmission gear ratio is determined by positions of the roller weights 45 relative to the second sheave body 34b. Therefore, the minimum transmission gear ratio of the CVT 15 is determined by restricting positions of maximum displacements of the roller weights 45.

Specifically, as shown in FIGS. 3 and 4, the second sheave body 34b has a plurality of stoppers 66. The stoppers 66, respectively, overhang toward the cam plate 43 from a distal end of the cam surface 41 and are aligned at intervals circumferentially of the second sheave body 34b. The stoppers 66 overhang the cam plate 43 from outside when the second sheave body 34b is slid to a position most distant from the first sheave body 34a.

As shown in FIGS. 4, 6, and 8, the respective stoppers 66 have a stopper surface 67 and a single projection 68. The stopper surface 67 is a plane that is in parallel to the axis O1 of the roller weight 45 and the outer peripheral surface of the boss 35 of the second sheave body 34b and opposed to the outer surface 47a of the outer ring 47 of the roller weight 45. The stopper surfaces 67 have a lengthwise dimension that exceeds an axial dimension of the roller weights 45.

As shown in FIG. 7, the projection 68 is angular in shape to have two angles 69a, 69b. The projection 68 projects toward the roller weight 45 from the stopper surface 67. The projection 68 is positioned centrally in a lengthwise direction of the stopper surface 67 and extends straight in a direction, in which the second sheave body 34b slides. A height H, by which the projection 68 projects from the stopper surface 67, is smaller than a thickness of the outer ring 47 of the roller weight 45. Further, a width W of the projection 68 is smaller than an overall length of the roller weight 45.

The projection 68 comes into contact with the outer surface 47a of the roller weight 45 when the second sheave body 34b has moved to a position, in which the transmission gear ratio is determined. Such contact restricts movements of the roller weight 45 caused by centrifugal forces, and the width L1 of the first belt groove 37 and a diameter, at which the belt 31 is entrained about the primary sheave 29, are determined to obtain the minimum transmission gear ratio.

FIGS. 12 and 13 show a state, in which the second sheave body 34b of the primary sheave 29 has moved to a position of the minimum transmission gear ratio through fresh roller weights 45. The outer surfaces 47a of the roller weights 45 contact with the cam plate 43, the projections 68, and the cam surfaces 41. When those portions of the outer surfaces 47a, which contact with the cam plate 43 and the cam surfaces 41, begin wear, forces, with which the second sheave body 34b is pushed against the first sheave body 34a, are lost by amounts that correspond to such wear. Therefore, the second sheave body 34b cannot be held in a position of the minimum transmission gear ratio.

With the construction, however, when the second sheave body 34b slides to the position of the minimum transmission gear ratio, the projections 68 of the stoppers 66 come into contact with the outer surfaces 47a of the roller weights 45. Therefore, those portions of the outer surfaces 47a of the roller weights 45, which contact with the projections 68, are increased in surface pressure.

Besides, the outer ring 47 that defines the outer surface 47a of the roller weight 45 is made of a resin material such as nylon to be lower in hardness than the metallic second sheave body 34b. In other words, since the projection 68 of the second sheave body 34b is harder than the outer ring 47, that portion of the outer surface 47a of the outer ring 47, which contacts with the projection 68, wears positively. From the above, the stoppers 66 are shaped to accelerate partial wear of the outer surfaces 47a of the roller weights 45.

FIGS. 14 and 15 show a state, in which that portion of the outer ring 47 of the roller weight 45, which contacts with the projection 68, has worn locally. A recess 70 that permits the projection 68 to enter the outer surface 47a of the outer ring 47 of the roller weight 45 is formed due to such wear of the outer ring 47, and a state, in which the roller weight 45 bites into the projection 68, comes out.

As a result, the roller weights 45 move radially outwardly of the second sheave body 34b by an amount that corresponds to a height H, by which the projections 68 projects, and push the second sheave body 34b toward the first sheave body 34a. Thereby, the width L1 of the first belt groove 37 decreases and a diameter, at which the belt 31 is entrained about the primary sheave 29, increases.

FIG. 16 shows the relationship between travel distance (time) of a motorcycle and a manner of a change in speed ratio when the CVT 15 is in an operating state of a minimum transmission gear ratio. As shown in FIG. 16, when the outer surfaces 47a of the roller weights 45 are caused to partially wear positively to push the second sheave body 34b toward the first sheave body 34a, it is possible to change the speed ratio in a direction, in which the transmission gear ratio is decreased. In other words, a manner, in which the speed ratio changes at the minimum transmission gear ratio, become quite opposite to a conventional one.

Therefore, even when the roller weights 45 wear, it is possible to correct the speed ratio in a manner to cancel a variation of the speed ratio in a direction, in which the transmission gear ratio is increased. Accordingly, it is possible to maintain a minimum transmission gear ratio of the CVT 15 at a predetermined value without being influenced by travel distance and to suppress a change in speed ratio at a minimum transmission gear ratio to a small amount.

Accordingly, it is possible to dissolve a disadvantage that when the motorcycle 1 is operated at a minimum transmission gear ratio, an engine speed exceeds a proper value much and a traveling speed does not reach a target value.

Besides, a simple construction, in which only the projections 68 are formed on the stopper surfaces 67, makes it possible to prevent a change in speed ratio at a minimum transmission gear ratio. As a result, it becomes unnecessary to sharply modify the CVT 15 in design, which is advantageous in terms of cost.

Further, the CVT 15 in the embodiment adopts the use of the belt 31 of high strength, in which the plurality of block pieces 60 made of a resin are connected together in an endless manner. The belt 31 of this type has such a property that elongation of about 0.4% is generated in the initial stage of use but little dimensional change is shown thereafter. Therefore, when wear of the roller weights 45 causes a change in speed ratio in a direction, in which the transmission gear ratio is increased, such change in transmission gear ratio cannot be accommodated by the belt 31.

More specifically, with general belt type continuous variable transmissions, in which a rubber belt is used, in the case where the rubber belt generates elongation, a diameter, at which the rubber belt is entrained about a secondary sheave, increases even when a diameter, at which the rubber belt is entrained about a primary sheave, does not change. Therefore, a change in speed ratio is caused in a direction, in which a transmission gear ratio is increased. Further, when the rubber belt has worn, a diameter, at which the rubber belt is entrained about the primary sheave, decreases, and a change in speed ratio is also caused in a direction, in which a transmission gear ratio is increased.

In contrast, in the case where the rubber belt has contracted, a diameter, at which the rubber belt is entrained about the secondary sheave, decreases even when a diameter, at which the rubber belt is entrained about the primary sheave, does not change. Therefore, a change in speed ratio is caused in a direction, in which a transmission gear ratio is decreased.

Accordingly, with belt type continuous variable transmissions, in which a rubber belt is used, contraction of the rubber belt makes it possible to compensate for a change in speed ratio even when wear of the rubber belt and roller weights causes a change in speed ratio in a direction, in which a transmission gear ratio is increased. As a result, a change in speed ratio is decreased at a minimum transmission gear ratio in the case where that change in speed ratio, which accompanies wear of the rubber belt and roller weights, and that change in speed ratio, which accompanies contraction of the rubber belt, balance each other.

On the other hand, since the belt 31 according to the embodiment is structured such that the plurality of block pieces 60 are connected together, contraction cannot be generated while elongation can be generated. Therefore, all wear and elongation of the belt 31 and wear of the roller weights 45 cause a change in speed ratio in a direction, in which a transmission gear ratio is increased.

According to the embodiment, the outer rings 47 of the roller weights 45 are caused to bite into the projection 68 whereby the roller weights 45 are moved radially outwardly of the second sheave body 34b. Thereby, a change in speed ratio is caused in a direction, in which a transmission gear ratio is decreased. Accordingly, a change in speed ratio at a minimum transmission gear ratio can be compensated for even in that construction, in which it is difficult for the belt 31 to accommodate a variation of the speed ratio.

FIG. 17 shows a second embodiment of the invention.

The second embodiment is different from the first embodiment in stoppers 66 on a second sheave body 34b. The second embodiment is the same as the first embodiment except the above. Therefore, the same constituents as those in the first embodiment are denoted by the same reference numerals as those in the latter, and an explanation therefor is omitted.

As shown in FIG. 17, a pair of projections 81, 82 are formed on a stopper surface 67 of the stopper 66. The projections 81, 82 are angular in shape to project toward the roller weight 45 from the stopper surface 67. The projections 81, 82 are separate from each other in an axial direction of the roller weight 45 and extend straight in a direction, in which the second sheave body 34b slides.

With such construction, the projections 81, 82 come into contact with outer surfaces 47a of the roller weights 45 when the second sheave body 34b has moved to a position to determine a minimum transmission gear ratio. Such contact causes those portions of the outer surfaces 47a of the roller weights 45, which contact with the projections 81, 82, to wear positively, and a state, in which the roller weights 45 bite into the projections 81, 82, comes out. As a result, the roller weights 45 move radially outwardly of the second sheave body 34b. Accordingly, a change in speed ratio can be caused so as to decrease a transmission gear ratio in the same manner as in the first embodiment.

Besides, according to the second embodiment, the projections 81, 82 come into contact with the outer surface 47a of the roller weight 45 in two locations spaced from each other in the axial direction of the roller weight 45. Therefore, when the roller weights 45 contact with the projections 81, 82, the roller weights 45 are not inclined. Accordingly, the roller weights 45 move smoothly.

FIG. 18 shows a third embodiment of the invention.

The third embodiment is different from the first embodiment in a shape of projections 91 that project from stopper surfaces 67. The third embodiment is the same as the first embodiment except the above.

As shown in FIG. 18, the projections 91 comprise an arcuately curved top 91a. The tops 91a are closest to the outer surfaces 47a of the roller weights 45. The tops 91a come into contact with the outer surfaces 47a of the roller weights 45 when the second sheave body 34b has moved to a position to determine a minimum transmission gear ratio. Such contact causes those portions of the outer surfaces 47a of the roller weights 45, which contact with the projections 91, to wear positively, and a state, in which the roller weights 45 bite into the projections 91, comes out. As a result, the roller weights 45 move radially outwardly of the second sheave body 34b. Accordingly, a change in speed ratio can be caused so as to decrease a transmission gear ratio in the same manner as in the first embodiment.

FIG. 19 shows a fourth embodiment of the invention.

The fourth embodiment is different from the first embodiment in a shape of stoppers 66. The fourth embodiment is the same as the first embodiment except the above.

As shown in FIG. 19, the stoppers 66 comprise a stopper surface 100. The stopper surfaces 100 comprise a curved surface 101 having a top 100a that projects arcuately toward the outer surface 47a of the roller weight 45 as viewed in a diametrical direction of the roller weight 45. The top 100a is positioned centrally in a lengthwise direction of the stopper surface 100. Therefore, the stopper surface 100 is protuberant in a position of the top 100a and non-parallel to the outer surface 47a of the roller weight 45.

The tops 100a of the stopper surfaces 100 come into contact with the outer surfaces 47a of the roller weights 45 when the second sheave body 34b has moved to a position to determine a minimum transmission gear ratio. Such contact causes those portions of the outer surfaces 47a of the roller weights 45, which contact with the tops 100a of the stopper surfaces 100, to wear positively, and a state, in which the roller weights 45 bite into the stopper surfaces 100, comes out. Therefore, the roller weights 45 move radially outwardly of the second sheave body 34b. Accordingly, a change in speed ratio can be caused so as to decrease a transmission gear ratio in the same manner as in the first embodiment.

FIG. 20 shows a fifth embodiment of the invention.

The fifth embodiment is different from the fourth embodiment in a shape of stoppers 66.

As shown in FIG. 20, the stoppers 66 comprise a stopper surface 110. The stopper surfaces 110 comprise a curved surface 111 being arcuately concave in opposition to the outer surface 47a of the roller weight 45 as viewed in a diametrical direction of the roller weight 45. Therefore, the stopper surfaces 110 are non-parallel to the outer surfaces 47a of the roller weights 45. Further, the stopper surfaces 110 comprise a first end 110a and a second end 110b. The first and second ends 110a, 110b are closest to the outer surfaces 47a of the roller weights 45 in locations spaced from each other in a lengthwise direction of the stopper surfaces 110.

The roller weights 45 comprise a first corner 112a and a second corner 112b. The first corner 112a is defined by the outer surface 47a of the roller weight 45 and one of side surfaces and opposed to the first end 110a of the stopper surface 110. The second corner 112b is defined by the outer surface 47a of the roller weight 45 and the other of side surfaces and opposed to the second end 110b of the stopper surface 110.

The first and second ends 110a, 110b of the stopper surfaces 110 come into contact with the first and second corners 112a, 112b of the roller weights 45 when the second sheave body 34b has moved to a position to determine a minimum transmission gear ratio. Such contact causes the first and second corners 112a, 112b of the roller weights 45 to wear positively, and a state, in which the roller weights 45 bite into the stopper surfaces 110, comes out. Therefore, the roller weights 45 move radially outwardly of the second sheave body 34b. Accordingly, a change in speed ratio can be caused so as to decrease a transmission gear ratio in the same manner as in the first embodiment.

Further, according to the fifth embodiment, the first and second ends 110a, 110b of the stopper surfaces 110 come into contact with the first and second corners 112a, 112b of the roller weights 45. Therefore, when the roller weights 45 contact with the stopper surfaces 110, the roller weights 45 are not inclined. Accordingly, the roller weights 45 move smoothly.

FIGS. 21 to 23 show a sixth embodiment of the invention.

The sixth embodiment is different from the first embodiment in stoppers 66 on a second sheave body 34b. The sixth embodiment is the same as the first embodiment except the above. Therefore, the same constituents as those in the first embodiment are denoted by the same reference numerals as those in the latter, and an explanation therefor is omitted.

As shown in FIGS. 21 and 22, stopper surfaces 67 of the stoppers 66 comprise a first contact portion 120. The first contact portion 120 projects toward the roller weight 45 from centrally in a lengthwise direction of the stopper surface 67 and extends straight in a direction, in which the second sheave body 34b slides. The first contact portions 120 are made of a material such as graphite or a sintered body, and fixed to the stopper surfaces 67 by means of bonding. The first contact portions 120 are lower in hardness than the outer rings 47 of the roller weights 45 and the second sheave body 34b.

The first contact portions 120 come into contact with the outer surfaces 47a of the roller weights 45 when the second sheave body 34b has moved to a position to determine a minimum transmission gear ratio. Such contact restricts movements of the roller weight 45 caused by centrifugal forces, and the width L1 of the first belt groove 37 and a diameter, at which the belt 31 is entrained about the primary sheave 29, are determined to obtain a minimum transmission gear ratio.

The stopper surfaces 67 of the stoppers 66 are positioned outwardly of the first contact portions 120 in a radial direction of the second sheave body 34b. Thus the stopper surfaces 67 constitute second contact portions lower than the first contact portions 120.

FIG. 21 shows a state, in which the second sheave body 34b of the primary sheave 29 has moved to a position of a minimum transmission gear ratio through fresh roller weights 45. At this time, the outer rings 47 of the roller weights 45 contact with the cam plate 43, the cam surfaces 41, and the first contact portions 120. When those portions of the outer surfaces 47a of the outer rings 47, which contact with the cam plate 43 and the cam surfaces 41, begin wear, forces, with which the second sheave body 34b is pushed against the first sheave body 34a, are lost by amounts that correspond to such wear. Therefore, the second sheave body 34b cannot be held in a position of the minimum transmission gear ratio.

With the above construction, however, the first contact portions 120, with which the outer surfaces 47a of the roller weights 45 contact, are made of a material having a lower hardness than that of the outer rings 47 of the roller weights 45. Thereby, the first contact portions 120 on the stoppers 66 wear due to contact with the roller weights 45 and are removed from the stoppers 66 with the lapse of operating time.

Most of the first contact portions 120 is shaved off at a point of time when contact portions of the roller weights 45 and the cam surfaces 41 and contact portions of the roller weights 45 and the cam plate 43 have become stable in surface pressure. Therefore, as shown in FIG. 23, the roller weights 45 move by an amount corresponding to a thickness of the first contact portions 120 radially outwardly of the second sheave body 34b and the outer surfaces 47a of the roller weights 45 abut against the stopper surfaces 67 as second contact portions. As a result, the width L1 of the first belt groove 37 decreases and a diameter, at which the belt 31 is entrained about the primary sheave 29, increases.

Accordingly, even when the roller weights 45 wear, a change in speed ratio can be caused so as to decrease a transmission gear ratio in the same manner as in the first embodiment. Thereby, it is possible to suppress a change in speed ratio at a minimum transmission gear ratio to a small amount.

In the respective embodiments, the second sheave body is provided with stoppers. However, the invention is not limited to this. For example, stoppers may be formed integral with an outer peripheral edge of the cam plate to extend toward the second sheave body in a flanged manner and to restrict movements of the roller weights.

Further, push bodies that move the second sheave body are not limited to the roller weights. For example, one ends of arm-shaped swinging weights may be pivotally supported on the second sheave body and push rollers that contact with edges of the swinging weights may be provided on a rotating member that rotates together with the second sheave body.

With such construction, the swinging weights turn in a manner to spring toward the rotating member from the second sheave body according to centrifugal forces that are generated upon rotation of the second sheave body. Such turning moves edges on outer surfaces of the swinging weights along outer peripheral surfaces of the push rollers. Therefore, the second sheave body moves in a direction toward the first sheave body with contact portions of the swinging weights and the push rollers as fulcrums. When the second sheave body 34b has moved to a position to determine a minimum transmission gear ratio, positions of contact between the push rollers and the edges of the swinging weights arrive in the vicinity of the other ends of the swinging weights.

Accordingly, with such construction, the swinging weights function as push bodies that move the second sheave body.

In addition, a vehicle according to the invention is not limited to motorcycles. The invention can be likewise embodied on, for example, ATV (All Terrain Vehicle) having three or four wheels for rough terrain traveling, or snowmobiles.

Further, in a power unit according to the invention, a drive source is not limited to engines but may comprise, for example, a motor, or a hybrid module with a motor and an engine combined.

INDUSTRIAL APPLICABILITY

According to the invention, even when the push bodies wear, it is possible to cancel a variation in speed ratio, by which an increase in transmission gear ratio is caused. Therefore, it is possible to suppress a change in speed ratio at a minimum transmission gear ratio to a small amount, and it is possible to dissolve a disadvantage that when a vehicle such as motorcycle is operated at a minimum transmission gear ratio, an engine speed exceeds a proper value much and a traveling speed does not reach a target value.

The invention claimed is:

1. A belt type continuous variable transmission comprising:
   a primary sheave that outputs torque,
   a secondary sheave that receives torque from the primary sheave, and
   a belt entrained between the primary sheave and the secondary sheave in an endless manner to transmit torque to the secondary sheave from the primary sheave, wherein the primary sheave comprises:
      a first sheave body,
      a second sheave body provided to be relatively slidable in a direction toward and away from the first sheave body and forming between the second sheave body and the first sheave body a belt groove, about which the belt is entrained,
      a plurality of push bodies that rotate together with the second sheave body and move radially of the second sheave body according to centrifugal forces generated at the time of rotation of the second sheave body, such movements causing the second sheave body to slide to change a width of the belt groove, and
      a plurality of stoppers that restrict movements of the push bodies by contacting with outer surfaces of the push bodies when the second sheave body reaches a position of minimum transmission gear ratio, in which the belt groove is made smallest in width, the stoppers being shaped to accelerate partial wear of the outer surfaces of the push bodies, wherein
      each of the plurality of push bodies includes a roller weight and at least outer peripheries thereof are lower in hardness than the plurality of stoppers.

2. The belt type continuous variable transmission according to claim 1, wherein the stoppers are formed on the second sheave body.

3. The belt type continuous variable transmission according to claim 1 or claim 2, wherein the respective stoppers comprise a stopper surface opposed to an outer surface of the push body and at least one projection projecting from the stopper surface.

4. The belt type continuous variable transmission according to claim 1 or claim 2, wherein the respective stoppers comprise a stopper surface opposed to an outer surface of the push body, and the stopper surface is non-parallel to the outer surface of the push body.

5. The belt type continuous variable transmission according to claim 4, wherein the stopper surface comprises a curved surface having a top that projects arcuately toward the outer surface of the push body, and the top of the curved surface contacts with the outer surface of the push body.

6. The belt type continuous variable transmission according to claim 4, wherein the push bodies comprise a first corner and a second corner, the stopper surfaces comprise a curved surface being arcuately concave in opposition to the outer surface of the push body, the curved surfaces comprise a first end and a second end spaced from each other, and the first and second ends contact with the first and second corners of the push body.

7. A belt type continuous variable transmission comprising:
   a primary sheave that outputs torque,
   a secondary sheave that receives torque from the primary sheave, and a belt entrained between the primary sheave and the secondary sheave in an endless manner to transmit torque to the secondary sheave from the primary sheave, wherein the primary sheave comprises:
- a first sheave body,
- a second sheave body provided to be relatively slidable in a direction toward and away from the first sheave body and forming between the second sheave body and the first sheave body a belt groove, about which the belt is entrained,
- a plurality of push bodies that rotate together with the second sheave body and move radially of the second sheave body according to centrifugal forces generated at the time of rotation of the second sheave body, such movements causing the second sheave body to slide to change a diameter, at which the belt is entrained about the primary sheave, and
- a plurality of stoppers that restrict movements of the push bodies by contacting with outer surfaces of the push bodies when the second sheave body reaches a position of minimum transmission gear ratio, in which a diameter, at which the belt is entrained, is made largest, the stoppers comprising at least one projection projecting toward the outer surface of the push body, wherein
- each of the plurality of push bodies includes a roller weight and at least outer peripheries thereof are lower in hardness than the plurality of stoppers.

8. The belt type continuous variable transmission according to claim 7, wherein the at least outer peripheries of the plurality of push bodies are lower in hardness than the projections of the plurality of stoppers.

9. The belt type continuous variable transmission according to claim 1 or 7, wherein the second sheave body comprises a plurality of cam surfaces, with which the push bodies contact, and the stoppers are positioned at ends of the cam surfaces.

10. The belt type continuous variable transmission according to claim 9, wherein the primary sheave comprises a cam plate opposed to the cam surfaces of the second sheave body and rotating together with the second sheave body, and the push bodies are interposed between the cam surfaces and the cam plate and contact with the stoppers and the cam plate when the second sheave body reaches a position of minimum transmission gear ratio.

11. A belt type continuous variable transmission comprising:
- a primary sheave that outputs torque,
- a secondary sheave that receives torque from the primary sheave, and
- a belt entrained between the primary sheave and the secondary sheave in an endless manner to transmit torque to the secondary sheave from the primary sheave, wherein the primary sheave comprises:
  - a first sheave body,
  - a second sheave body provided to be relatively slidable in a direction toward and away from the first sheave body and forming between the second sheave body and the first sheave body a belt groove, about which the belt is entrained,
  - a plurality of roller weights that rotate together with the second sheave body and move radially of the second sheave body according to centrifugal forces generated at the time of rotation of the second sheave body, such movements causing the second sheave body to slide to change a diameter, at which the belt is entrained about the primary sheave, and
  - a plurality of stoppers that restrict movements of the roller weights by contacting with outer surfaces of the roller weights when the second sheave body reaches a position of minimum transmission gear ratio, in which a diameter, at which the belt is entrained, is made largest, the stoppers comprising a plurality of projections projecting toward the outer surface of the roller weight, the projections being spaced from each other in an axial direction of the roller weight, wherein
  - at least outer peripheries of the plurality of roller weights are lower in hardness than the plurality of stoppers.

12. A belt type continuous variable transmission comprising:
- a primary sheave that outputs torque,
- a secondary sheave that receives torque from the primary sheave, and
- a belt entrained between the primary sheave and the secondary sheave in an endless manner to transmit torque of the primary sheave to the secondary sheave, wherein the primary sheave comprises:
  - a first sheave body,
  - a second sheave body provided to be relatively slidable in a direction toward and away from the first sheave body and forming between the second sheave body and the first sheave body a belt groove, about which the belt is entrained,
  - a plurality of push bodies that rotate together with the second sheave body and move radially of the second sheave body according to centrifugal forces generated at the time of rotation of the second sheave body, such movements causing the second sheave body to slide to change a width of the belt groove, and
- a plurality of stoppers that restrict movements of the push bodies when the second sheave body reaches a position of minimum transmission gear ratio, in which the belt groove is made smallest in width, the stoppers comprising a first contact portion that contacts with the push body when the second sheave body reaches the position of minimum transmission gear ratio, and a second contact portion positioned outside of the first contact portion radially of the second sheave body, the first contact portion being lower in hardness than the push bodies and the second contact portion.

13. The belt type continuous variable transmission according to claim 12, wherein the push bodies comprise a roller weight, and at least outer peripheries thereof are lower in hardness than the second contact portions of the stoppers.

14. The belt type continuous variable transmission according to any one of claims 1, 7, 11, and 12, wherein the belt comprises a plurality of block pieces and a connecting body that connects the block pieces together in an endless manner.

15. A power unit comprising:
- a drive source, and
- a belt type continuous variable transmission interlocking with the drive source, the belt type continuous variable transmission comprising:
  - a primary sheave that outputs torque transmitted from the drive source,
  - a secondary sheave that receives torque from the primary sheave, and
  - a belt entrained between the primary sheave and the secondary sheave in an endless manner to transmit torque to the secondary sheave from the primary sheave, wherein the primary sheave comprises:
a first sheave body,
a second sheave body provided to be relatively slidable in a direction toward and away from the first sheave body and forming between the second sheave body and the first sheave body a belt groove, about which the belt is entrained,
a plurality of push bodies that rotate together with the second sheave body and move radially of the second sheave body according to centrifugal forces generated at the time of rotation of the second sheave body, such movements causing the second sheave body to slide to change a width of the belt groove, and
a plurality of stoppers that restrict movements of the push bodies by contacting with outer surfaces of the push bodies when the second sheave body reaches a position of minimum transmission gear ratio, in which the belt groove is made smallest in width, the stoppers being shaped to accelerate partial wear of the outer surfaces of the push bodies, wherein
each of the plurality of push bodies includes a roller weight and at least outer peripheries thereof are lower in hardness than the plurality of stoppers.

16. The power unit according to claim 15, wherein the drive source comprises an engine having a crank shaft and the primary sheave receives torque from the crank shaft to be rotated.

17. The power unit according to claim 15, wherein the respective stoppers comprise a stopper surface opposed to an outer surface of the push body and at least one projection projecting from the stopper surface.

18. A vehicle comprising:
a frame,
a drive source supported on the frame, and
a belt type continuous variable transmission interlocking with the drive source, the belt type continuous variable transmission comprising:
a primary sheave that outputs torque transmitted from the drive source,
a secondary sheave that receives torque from the primary sheave, and
a belt entrained between the primary sheave and the secondary sheave in an endless manner to transmit torque to the secondary sheave from the primary sheave, wherein
the primary sheave comprises:
a first sheave body,
a second sheave body provided to be relatively slidable in a direction toward and away from the first sheave body and forming between the second sheave body and the first sheave body a belt groove, about which the belt is entrained,
a plurality of push bodies that rotate together with the second sheave body and move radially of the second sheave body according to centrifugal forces generated at the time of rotation of the second sheave body, such movements causing the second sheave body to slide to change a width of the belt groove, and
a plurality of stoppers that restrict movements of the push bodies by contacting with outer surfaces of the push bodies when the second sheave body reaches a position of minimum transmission gear ratio, in which the belt groove is made smallest in width, the stoppers being shaped to accelerate partial wear of the outer surfaces of the push bodies, wherein
each of the plurality of push bodies includes a roller weight and at least outer peripheries thereof are lower in hardness than the plurality of stoppers.

19. The vehicle according to claim 18, wherein the respective stoppers comprise a stopper surface opposed to an outer surface of the push body and at least one projection projecting from the stopper surface.

20. A sheave for continuous variable transmissions, comprising:
a first sheave body,
a second sheave body that forms between the second sheave body and the first sheave body a belt groove, about which a belt is entrained,
the second sheave body being enabled by a push body, which moves radially of the second sheave body according to centrifugal forces generated at the time of rotation of the second sheave body, to relatively slide in a direction toward and away from the first sheave body, and comprising:
a stopper that restricts movements of the push body by contacting with an outer surface of the push body when slid to a position of minimum transmission gear ratio, in which the belt groove is made smallest in width, the stopper being shaped to accelerate partial wear of the outer surface of the push body, wherein
the push body includes a roller weight and at least an outer periphery thereof is lower in hardness than the stopper.

21. The sheave for belt type continuous variable transmissions, according to claim 20, wherein the stopper comprises a stopper surface opposed to an outer surface of the push body and at least one projection projecting from the stopper surface.

22. The sheave for belt type continuous variable transmissions, according to claim 21, wherein the stopper surface and the projection are higher in hardness than the push body.

* * * * *